United States Patent
Perras et al.

(10) Patent No.: US 12,063,579 B2
(45) Date of Patent: Aug. 13, 2024

(54) PROCEDURE ENABLING CONFIGURATION OF PC5 COMMUNICATION PARAMETERS FOR ADVANCED VEHICLE TO EVERYTHING (V2X) SERVICES

(71) Applicant: InterDigital Patent Holdings, Inc., Wilmington, DE (US)

(72) Inventors: Michelle Perras, Montreal (CA); Saad Ahmad, Montreal (CA); Martino M. Freda, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/940,738

(22) Filed: Sep. 8, 2022

(65) Prior Publication Data

US 2023/0007458 A1 Jan. 5, 2023

Related U.S. Application Data

(63) Continuation of application No. 17/056,254, filed as application No. PCT/US2019/032908 on May 17, 2019, now Pat. No. 11,477,623.

(Continued)

(51) Int. Cl.
*H04W 4/50* (2018.01)
*H04W 4/40* (2018.01)
*H04W 84/00* (2009.01)

(52) U.S. Cl.
CPC .............. *H04W 4/50* (2018.02); *H04W 4/40* (2018.02); *H04W 84/005* (2013.01)

(58) Field of Classification Search
CPC ........ H04W 4/50; H04W 4/40; H04W 84/005
See application file for complete search history.

(56) References Cited

U.S. PATENT DOCUMENTS 9,661,523 B1 * 5/2017 Tamhane .......... H04W 56/0065
10,212,564 B2   2/2019 Watfa et al.
(Continued)

FOREIGN PATENT DOCUMENTS

CN   107734545 A   2/2018
CN   107771398 B   11/2020
(Continued)

OTHER PUBLICATIONS

Fadillah, Purnama Rezha, et al., "Adaptive Transmission Power in Cluster-based Routing VANET", School of Electronic Engineering, Kumoh National Institute of Technology, Communications (APCC), 2012 18th Asia-Pacific Conference on, IEEE, XP032278804, Oct. 15, 2012, pp. 539-543.

(Continued)

*Primary Examiner* — Ernest G Tacsik
(74) *Attorney, Agent, or Firm* — Flaster Greenberg P.C.

(57) ABSTRACT

Methods and apparatuses are described herein for dynamic PC5 communication adaptation. For example, a UE may receive, from a vehicle-to-everything control function (V2X CF) or a vehicle-to-everything application server (V2X AS), a V2X provisioning message that includes a first transmission profile and determine, based on the first transmission profile, a first range to configure PC5 communication of a plurality of UEs associated with the V2X platoon. When a number of UEs joining the V2X platoon exceeds a certain threshold, the UE may transmit, to the V2X CF or the V2X AS, a modification request message requesting a second transmission profile. The UE may receive, from the V2X CF or the V2X AS, a modification response message that includes the second transmission profile and determine, based on the second transmission profile, a second range to reconfigure the PC5 communication of the plurality of UEs associated with the V2X platoon.

17 Claims, 13 Drawing Sheets

Related U.S. Application Data

(60) Provisional application No. 62/741,273, filed on Oct. 4, 2018, provisional application No. 62/672,874, filed on May 17, 2018.

(56) References Cited

U.S. PATENT DOCUMENTS

| | | | | |
|---|---|---|---|---|
| 2002/0160803 | A1* | 10/2002 | Ishikawa | H04W 52/143 455/13.4 |
| 2010/0256852 | A1* | 10/2010 | Mudalige | G08G 1/164 701/24 |
| 2016/0050698 | A1* | 2/2016 | Siomina | H04W 72/20 370/329 |
| 2016/0295624 | A1 | 10/2016 | Novlan et al. | |
| 2017/0230780 | A1 | 8/2017 | Chincholi et al. | |
| 2018/0041863 | A1 | 2/2018 | Taylor | |
| 2018/0279096 | A1* | 9/2018 | Wu | H04W 72/121 |
| 2018/0324631 | A1* | 11/2018 | Jheng | H04L 5/0055 |
| 2019/0104525 | A1* | 4/2019 | Santhanam | H04L 1/1825 |
| 2019/0132804 | A1 | 5/2019 | Hong et al. | |
| 2020/0021451 | A1* | 1/2020 | Pinheiro | H04W 4/40 |
| 2020/0045579 | A1 | 2/2020 | Xu et al. | |
| 2020/0100119 | A1* | 3/2020 | Byun | H04W 76/14 |
| 2020/0178043 | A1* | 6/2020 | Cavalcanti | H04W 4/08 |
| 2020/0305167 | A1 | 9/2020 | Freda et al. | |
| 2020/0314612 | A1 | 10/2020 | Kang et al. | |
| 2021/0029590 | A1 | 1/2021 | Ying et al. | |
| 2021/0058748 | A1 | 2/2021 | Liao | |
| 2021/0084460 | A1 | 3/2021 | Yang et al. | |
| 2021/0289399 | A1 | 9/2021 | Yang et al. | |

FOREIGN PATENT DOCUMENTS

| | | |
|---|---|---|
| JP | 6296335 B2 | 3/2018 |
| WO | WO 2016/148399 A1 | 9/2016 |
| WO | WO 2017/136627 A1 | 8/2017 |
| WO | WO 2017/183865 A2 | 10/2017 |
| WO | WO 2018/016157 A1 | 1/2018 |
| WO | WO 2018/028694 A1 | 2/2018 |
| WO | WO 2018/171222 A1 | 9/2018 |
| WO | WO 2018/227039 A1 | 12/2018 |

OTHER PUBLICATIONS

S2-176015, "Assumptions for V2X Group Communications", Lenovo, Motorola Mobility, SA WG2 Meeting #122bis, Sophia-Antipolis, France, XP051335464, Aug. 29, 2017, 3 Pages.

S6-180339, "V2X application layer functional model", 3GPP TSG-SA WG6 Meeting #22, Sophia Antipolis, France, Mar. 5-9, 2018, 6 Pages.

3rd Generation Partnership Project; Technical Specification Group Services and System Aspects; Architecture enhancements for V2X services (Release 15) 3GPP TS 23.285 V15.0.0 Mar. 2018 (Year: 2018).

Huawei et al., "Proposal for evaluation of solution#6," 3GPP TSG-SA WG6 Meeting #24, S6-180842, Osaka, Japan (May 21-25, 2018).

Huawei et al., "Proposal for Solution on V2X application layer functional model," 3GPP TSG-SA WG6 Meeting #22, S6-180417, Sophia Antipolis, France (Mar. 5-9, 2018).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "Solution #11 Updated with Privacy Handling for Multicast Communication," SA WG2 Meeting #129, S2-1810774, Dongguan, P.R. China (Oct. 15-19, 2018).

Memedi et al., "Cluster-based transmit power control in heterogeneous vehicular networks," 2015 IEEE Vehicular Networking Conference (VNC), Kyoto, Japan, pp. 60-63 (2015).

Qualcomm Incorporated et al., "Support of the group communication over NR PC5," SA WG2 Meeting #129, S2-1810808, Dongguan, P.R. China (Oct. 15-19, 2018).

Third Generation Partnership Project, "Technical Specification Group Services and System Aspects; Application layer support for V2X services; Functional architecture and information flows; (Release 16)," 3GPP TS 23.286 V1.1.0 (Apr. 2019).

Third Generation Partnership Project, "Technical Specification Group Services and System Aspects; Architecture enhancements for 5G System (5GS) to support Vehicle-to-Everything (V2X) services (Release 16)," 3GPP TS 23.287 V0.3.0 (Apr. 2019).

Third Generation Partnership Project, "Technical Specification Group Services and System Aspects; Architecture enhancements for V2X services (Release 15)," 3GPP TS 23.285 V15.0.0 (Mar. 2018).

Third Generation Partnership Project, "Technical Specification Group Services and System Aspects; Architecture enhancements for V2X services (Release 15)," 3GPP TS 23.285 V15.3.0 (Mar. 2019).

Third Generation Partnership Project, "Technical Specification Group Services and System Aspects; Architecture enhancements for V2X services (Release 16)," 3GPP TS 23.285 V16.0.0 (Mar. 2019).

Third Generation Partnership Project, "Technical Specification Group Services and System Aspects; Intra-domain connection of Radio Access Network (RAN) nodes to multiple Core Network (CN) nodes (Release 14)," 3GPP TS 23.236 V14.0.0 (Sep. 2016).

Third Generation Partnership Project, "Technical Specification Group Services and System Aspects; Intra-domain connection of Radio Access Network (RAN) nodes to multiple Core Network (CN) nodes (Release 15)," 3GPP TS 23.236 V15.0.0 (Jun. 2018).

Third Generation Partnership Project, "Technical Specification Group Services and System Aspects; Study on architecture enhancements for EPS and 5G System to support advanced V2X services (Release 16)," 3GPP TR 23.786 V0.5.0 (May 2018).

Third Generation Partnership Project, "Technical Specification Group Services and System Aspects; Study on architecture enhancements for the Evolved Packet System (EPS) and the 5G System (5GS) to support advanced V2X services (Release 16)," 3GPP TR 23.786 V16.0.0 (Mar. 2019).

* cited by examiner

PROCEDURE ENABLING CONFIGURATION OF PC5 COMMUNICATION PARAMETERS FOR ADVANCED VEHICLE TO EVERYTHING (V2X) SERVICES

CROSS REFERENCE TO RELATED APPLICATION

This application is a continuation of U.S. Non-Provisional patent application Ser. No. 17/056,254, filed Nov. 17, 2020, which is the U.S. National Stage, under 35 U.S.C. § 371, of International Patent Application No. PCT/US2019/032908, filed May 17, 2019, which claims the benefit of U.S. Provisional Patent Application No. 62/672,874, filed May 17, 2018, and U.S. Provisional Patent Application No. 62/741,273, filed Oct. 4, 2018, the contents of which are incorporated herein by reference.

BACKGROUND

A platoon is a group of automated vehicles that are equipped with various antenna and sensors to communicate with each other or a base station (BS). Within a platoon, vehicles may exchange information such as position and kinematic status in order to enable context-aware cooperation. This would improve vehicle safety as well as efficiency of the road use because it allows vehicles to be aware of the location and direction of other vehicles in the vicinity. Platoon members (e.g., vehicles) within a same platoon may communicate with each other over PC5 interface, which is handled by an access stratum (AS) layer. The AS layer may need to be configured with a specific range based on platoon specific events and/or characteristics (e.g., a number of platoon members, type of devices, etc.). Thus, in order for the platoon members to join and/or leave the platoon at any moment, methods and apparatuses that dynamically adapt the configuration of PC5 communication are needed.

SUMMARY

Methods and apparatuses are described herein for use in a user equipment (UE) to dynamically adapt PC5 communication in a vehicle to everything (V2X) platoon. For example, a UE may receive, from a vehicle to everything control function (V2X CF) or a vehicle to everything application server (V2X AS), a V2X provisioning message that includes a first transmission profile. The first transmission profile may include includes one or more quality of service (QoS) parameters and one or more V2X specific parameters. Upon receiving the V2X provisioning message, the UE may determine, based on the first transmission profile, a first range to configure PC5 communication of a plurality of UEs associated with the V2X platoon. After the PC5 communication associated with the V2X platoon is initially configured with the first range, when a number of UEs joining the V2X platoon exceeds a maximum number of allowed UEs in the V2X platoon, the UE may transmit, to the V2X CF or the V2X AS, a modification request message requesting a second transmission profile. The UE may then receive, from the V2X CF or the V2X AS, a modification response message that includes the second transmission profile. The second transmission profile may include one or more quality of service (QoS) parameters and one or more V2X specific parameters. Upon receiving the modification response message, the UE may determine, based on the second transmission profile, a second range to reconfigure the PC5 communication of the plurality of UEs associated with the V2X platoon.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
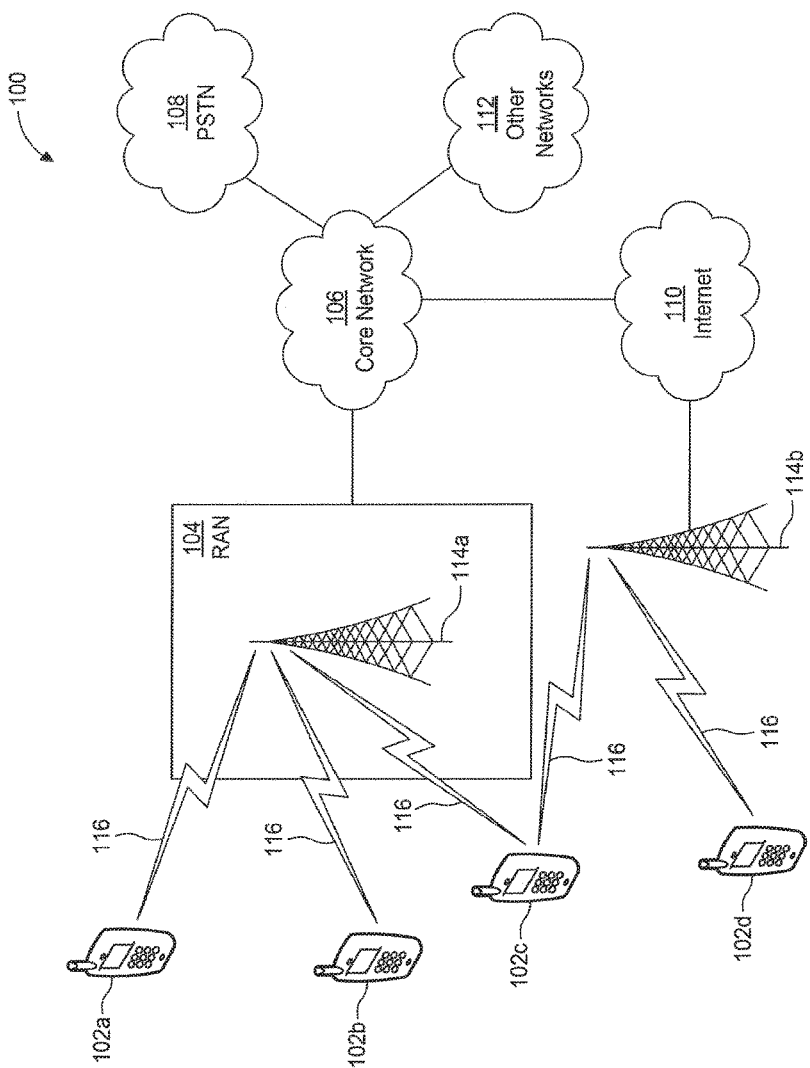
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a train, an airplane, a helicopter, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
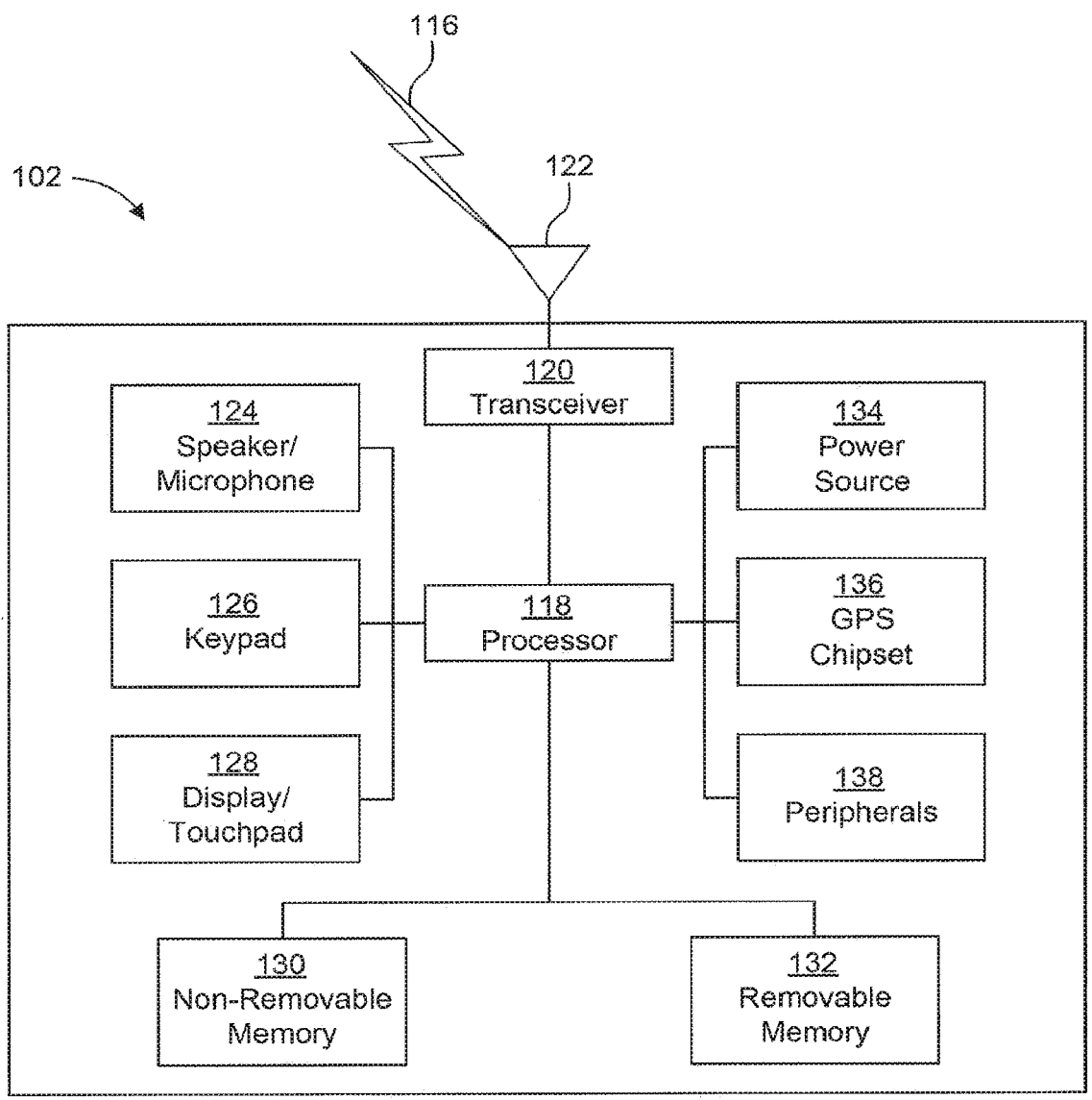
FIG. 1B is a system diagram illustrating an example wireless transmit/receive unit (WTRU) that may be used within the communications system illustrated in FIG. 1A according to an embodiment.
Figure 1C:
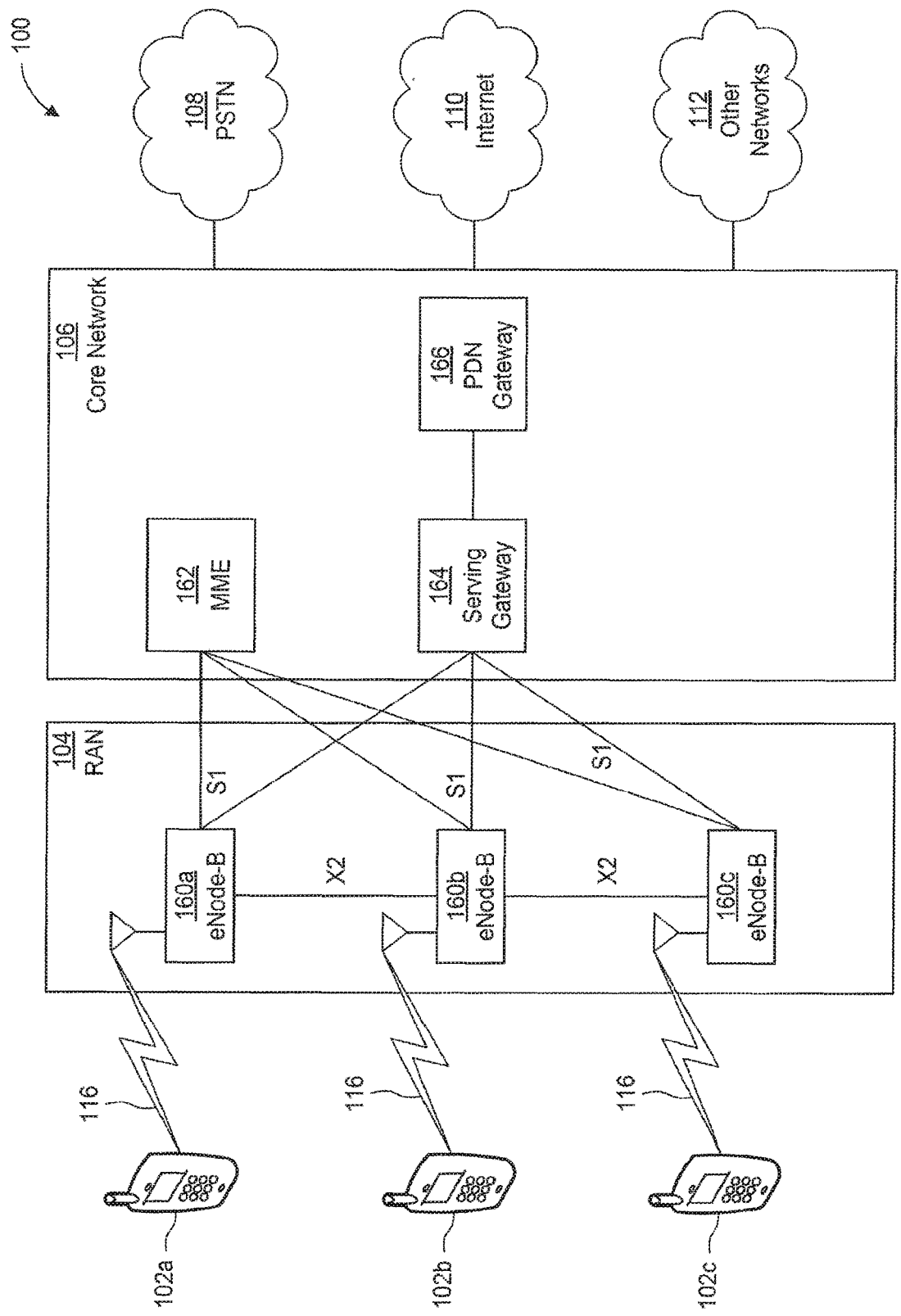
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
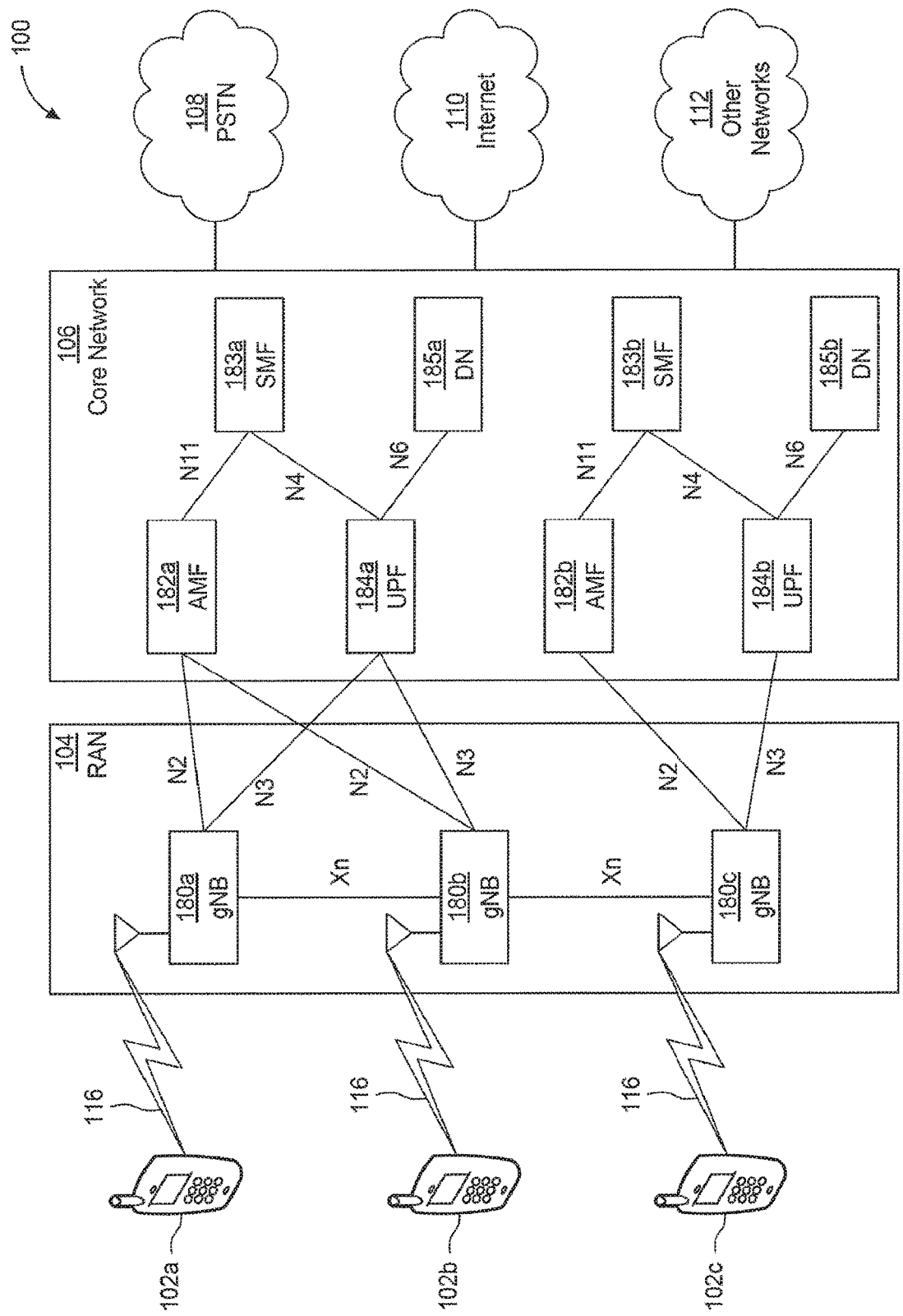
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In this disclosure, the terminology UE may be used as a generic term to identify a device on which one or more V2X application(s) may run. As used herein, the terms UE, WTRU and vehicle may be used interchangeably throughout this disclosure.

Figure 2:
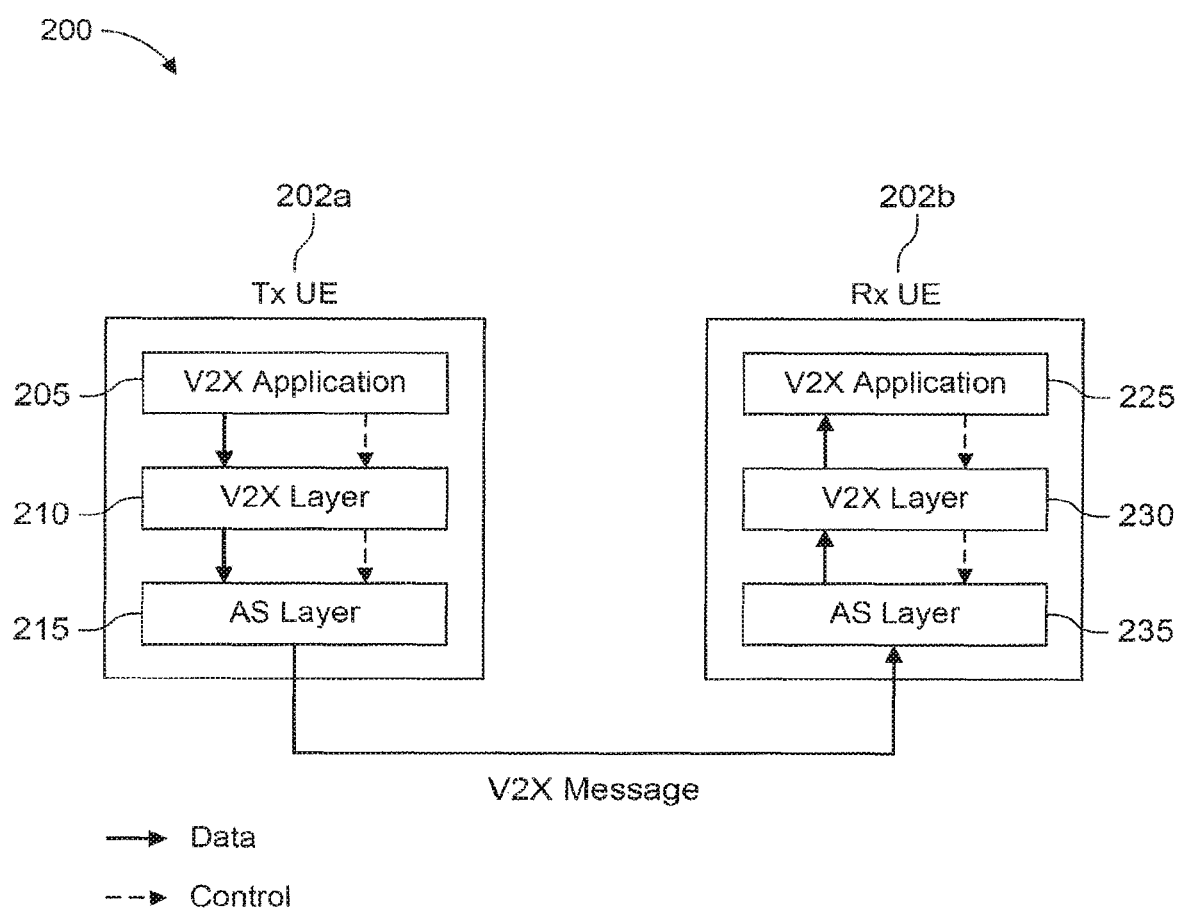
FIG. 2 is a diagram illustrating an example of end-to-end communication between user equipments (UEs) in a vehicle to everything (V2X) platoon.

FIG. 2 illustrates an example 200 of end-to-end communication between user equipments (UEs) in a vehicle to everything (V2X) platoon, which may be used in combination with any of other embodiments described herein. As illustrated in FIG. 2, a UE 202a or 202b may comprise one or more V2X applications 205 or 225, a V2X layer 210 or 230, and an access stratum (AS) layer 215 or 235. The V2X application 205 or 225 may be an application or an application layer that performs main functions of the V2X application 205 or 225 such as road safety control, group travel management, and device behavior management while communicating with a V2X application server (V2X AS) to report and receive information related to the function of the V2X application 205 or 225. For example, a V2X application in a UE (e.g., a truck) may report the amount of the UE's gasoline to the V2X AS and receive the amounts of other UEs' gasoline for group travel management. Another V2X application in a UE (e.g., a truck travels in the front of the group or platoon) may report road condition to other UEs in the same group so that other UEs may increase or decrease their respective traveling speed based on the road condition reported from the front UE. The V2X AS may collect information from one or more UEs in the same group or platoon and make decision based on the collected information. The V2X AS may send control messages to the UEs or the group to manage the behavior of the UEs or the group. The V2X application 205 or 225 may send a unicast, multicast, groupcast, or broadcast message to other V2X applications in other UEs in the group. It should be noted that a UE 202a or 202b may include one or more V2X applications 205 or 225 depending on its functionality or service that the V2X application 205 or 225 provides. The terms V2X application, V2X application layer, application, application layer, or any combination thereof may be used interchangeably throughout this disclosure.

The V2X layer 210 or 230 may be a layer that handles communication with other UEs, a V2X control function (CF) or a V2X AS. Since the V2X application 205 or 225 may require unicast, multicast, or broadcast communication with other V2X applications, the V2X layer 210 or 230 may handle these types of communication, Specifically, the V2X layer 210 or 230 may establish unicast, multicast, or broadcast communication for the V2X application 205 or 225 by configuring and/or communicating with the AS layer 215 or 235. For example, the V2X layer 210 or 230 may inform the AS layer 215 or 235 of the destination L2 ID for the group communication transmission, based on group identifier provided by the V2X application 205 or 225. The V2X layer 210 or 230 may also inform the AS layer 215 or 235 of the source L2 ID for the group communication transmission. The V2X layer 210 or 230 may inform the AS layer 215 or 235 of the communication type, and QoS parameters including 5QI and range (or transmission range) for the group communication traffic. Based on a transmission profile provided by a V2X CF (or PCF) or a V2X AS and RAN decision, the range may be dynamically (re)configured/ adjusted and provided to the AS layer 215 or 235 for the dynamic group communication operation. The V2X layer 210 or 230 may inform the AS layer 215 or 235 of the destination L2 ID for the group communication reception. The V2X layer 210 or 230 may convert the group identifier provided by the V2X application 205 or 225 into the destination L2 ID. The terms V2X layer and higher layer may be used interchangeably throughout this disclosure. The V2X layer may perform similar functions of a non-access stratum (NAS) layer. The AS layer 215 or 235 may be a layer that performs radio specific protocols such as PHY and MAC.

As described above, the V2X application 205 or 225 may determine the group identifier to perform the group management and pass down the group identifier to the V2X layer 210 or 230. For the Tx UE 202a side, the V2X layer 210 may convert the group identifier into the form of a destination L2 ID. The destination L2 ID may be passed down from the V2X layer 210 to the AS layer 215. The source L2 ID may be self-assigned by the UE 202a and may be provided by the V2X layer 210 to the AS layer 215. Furthermore, from the V2X application 205, QoS parameters associated with the group communication, identified by the group identifier, may be indicated to the V2X layer 210 via the control interface. The QoS parameters may include the characteristics represented by 5QI, and the range (or transmission range). When the V2X application 205 passes down the data packet that is associated with the group identifier, the V2X layer 210 may tag the data packet with the configured QoS settings (e.g., 5QI and range) and pass those down to the AS layer 215. The V2X layer 210 may also indicate to the AS layer 215 that it is for group communication, in order to differentiate it from broadcast traffic. At the Rx UE 202b side, the V2X layer 230 may also pass the destination L2 ID converted from the group identifier to the AS layer 235, such that it would be able to manage the receiving operation (e.g., performing HARQ).

When UEs 202a use PC5 group communication for the transmission of V2X messages, PC5 QoS parameters (e.g. VQI) and range may be used to (re)configure the V2X group communication over PC5 interface. When the V2X application 205 passes down the data packet that is associated with the group Identifier, the V2X application 205 may set the PC5 QoS parameters and range for each group identifier when passing V2X messages to the V2X layer 210 for transmission.

Figure 3:
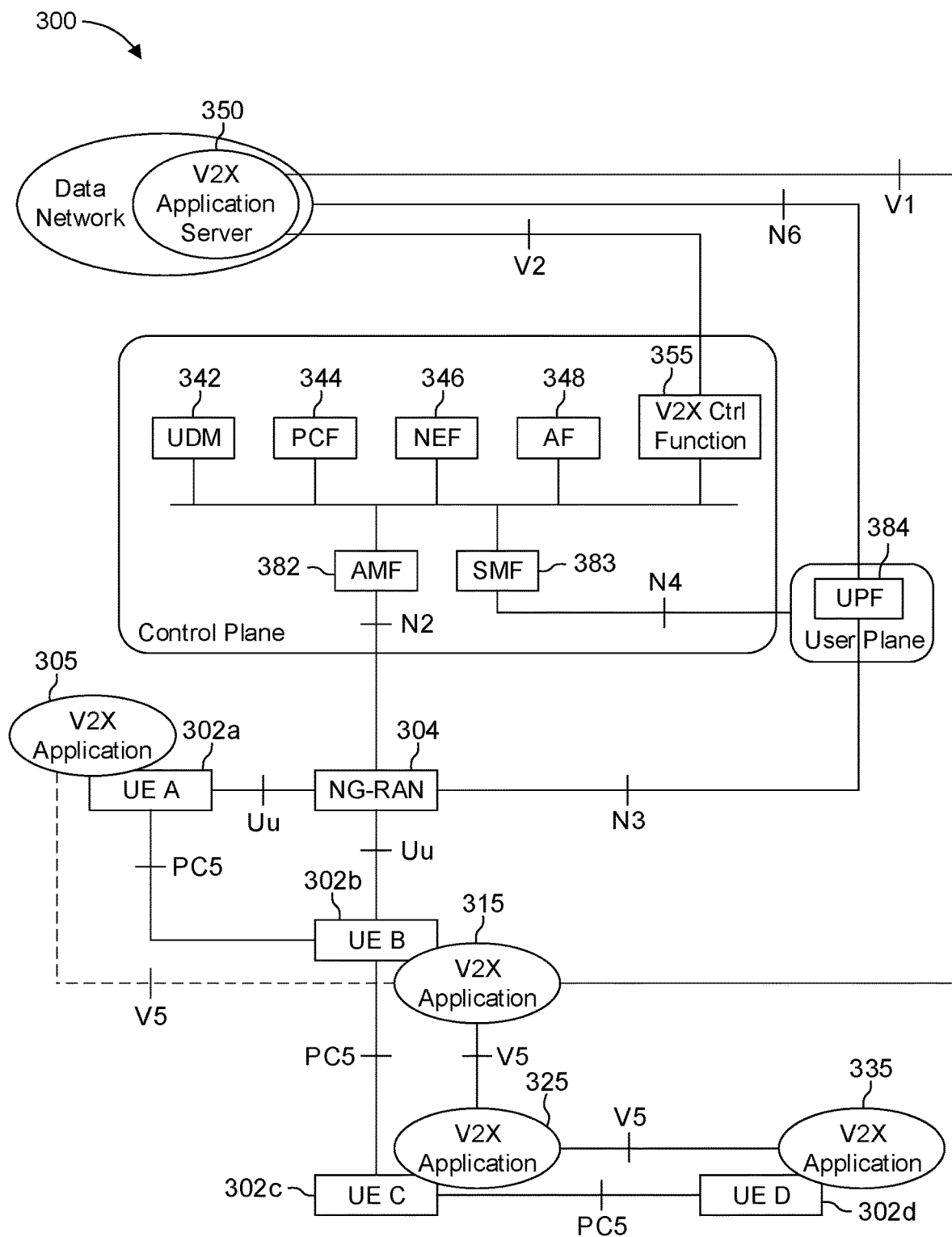
FIG. 3 is a diagram illustrating an example vehicle to everything (V2X) architecture.

FIG. 3 illustrates an example vehicle to everything (V2X) architecture 300, which may be used in combination of any of other embodiments described herein. As illustrated in FIG. 3, UEs A-D 302a-d may include V2X applications 305, 315, 325, 335 as described in FIG. 2. The UEs A-D 302a-d may be connected to each other with PC5 interface and V2X applications 305, 315, 325, 335 may use PC5 interface for the group communication. The UEs A-D 302a-d may also use Uu interface to communicate with RAN 304 (e.g., gNB). As illustrated in FIG. 3, the control plane may comprise Unified Data Management (UDM) 342, Policy Control Function (PCF) 344, Network Exposure Function (NEF) 346, Application Function (AF) 348, V2X control function (V2X CF) 355, AMF 382, and SMF 383. The user plane may comprise UPF 384. The UEs A-D 302a-d may communicate with PCF 344, V2X CF 355 via AMF 382. The UEs A-D 302a-d may also communicate the V2X application server (V2X AS) 350 in the data network via the V2X CF 355 or the PCF 344 (not illustrated in FIG. 3). The V2X AS 350 may be located in the network (e.g., data network) and may interface, via V1 interface connected to the V2X application 315, with V2X applications 305, 325, 335 installed on UEs A, C, D 302a, c, d using V5 interface. The V2X AS 350 may interface, via V2 interface, with the V2X CF 355. The V2X CF 355 or PCF 344 may handle V2X devices' authorization and provisioning (e.g., V2X policy and parameters configuration towards the UEs A-D 302a-d). The V2X CF 355 may be located in a 5G CN (e.g., for R16) and may be assumed to be part of the service-based architecture. The functionality of V2X CF 355 may be handled by the PCF entity 344. The V2X CF 355 (or PCF 344) may interact with UEs A-D 302a-d using non-access stratum (NAS)-based communication over the control plane interface, for example, using the Namf_Communication_N1N2MessageTransfer/ N1MessageNotify service of the AMF 382 and the NAS transparent container. V2X UE-to-UE communication may be based on two operation modes: one is over LTE-Uu reference point and the other is over PC5 reference point as illustrated in FIG. 3.

V2X services are described herein. A UE running one or more V2X applications may be provisioned with V2X specific parameters. Examples of the V2X specific parameters may include, but are not limited to, a list of supported V2X services such as destination V2X_Layer2_IDs and V2X application server address information such as fully qualified domain name (FQDN) or IP address.

A V2X application running on the UE may send data toward a V2X application server. The V2X application server may collect and process information from vehicle UEs, pedestrian UEs and/or road side units (RSUs), and may provide information to vehicle UEs, pedestrian UEs and/or RSUs. A UE may run multiple V2X applications simultaneously, where each of the V2X application may be associated with a different V2X_Layer2_IDs or V2X group IDs.

Vehicle platooning (or UE platooning) may be one of the main use cases for V2X or enhanced V2X (eV2X). Vehicles (or UEs) of the same platoon may dynamically share information to support platoon operation. For example, a group of trucks heading the same destination may share information to support the delivery operation. Examples of the information may include, but are not limited to, distance between vehicles, relative speed, amount of gas for each vehicles and updates from RSU. Sharing of information may be supported by creating a specific V2X group or V2X platoon within a V2X application.

All the vehicles (or UEs) in the platoon may receive periodic data from a leading vehicle (or leading UE), in order to carry on platoon operations. Platoon members may be provisioned by a V2X control function (V2X CF) and may interact with V2X application server (V2X AS). Platoon members may communicate with each other using PC5 communication, for example, proximity-based service (ProSe).

A V2X AS may assign roles (e.g., leader, follower) to V2X platoon members. A platoon leader may be selected and the selected platoon leader may control the group (e.g., handles join, leave requests, or the like); other devices (or UEs) in the platoon may be assigned as followers. The platoon leader may collect information from the platoon and forward the information to the V2X AS. Examples of the information may include, but are not limited to, statistics, alarms, or requests. The platoon leader may share the information with platoon members, potentially from the V2X AS or other platoon members in other platoons. The platoon follower may send information/statistics/alarms to the platoon leader and other platoon members in other platoons.

As described above, UE-to-UE communication (or vehicle-to-vehicle communication) in a platoon may be done over PC5 communication, which is handled at an access stratum (AS) layer. Thus, the AS layer may need to be configured with a specific range, for example, based on the platoon characteristics such as the number of platoon members, distance between UEs, type of devices, or the like. This range configuration may be handled on the UE by the higher layer (e.g., a V2X layer), which is provisioned with this information. The AS layer may pass this range configuration to a BS (e.g., a gNB), which considers it for resource allocation. Moreover, a platoon may need to be dynamic such that the platoon members that form the platoon may join and leave the platoon group at any moment. This means that the PC5 communication may need to adapt to such dynamic behavior. Thus, dynamically adapting the PC5 communication (e.g., range) configuration based on platoon specific events may be needed. In order to dynamically adapt the PC5 communication configuration, it needs to be determined that: (1) who should handle this dynamic adaptation; (2) which procedure should be followed; and (3) how to obtain a new configuration.

Moreover, platooning may be based on multicast communication and V2X multicast communication over PC5, which is not currently supported in 5G. Thus, a procedure to setup a multicast communication needs to be determined.

Lastly, potential tracking of L2 IDs may be identified for unicast and multicast communications. In addition, a multicast group identifier may as well be tracked, thus privacy handling needs to address multicast communications identifiers. Thus, handling privacy of a multicast communication (i.e. peers tracking and multicast group tracking) needs to be determined.

Embodiments that dynamically adapt the PC5 communication (e.g., range) configuration based on platoon specific events are described herein. In such embodiments, a platoon leader (e.g., UE) may be assigned with additional responsibilities. For example, the platoon leader may request a new transmission profile under certain conditions to dynamically adapt PC5 communication. The platoon leader may handle mapping of transmission profile to a range value. The platoon leader may also take local decisions for the platoon for the purpose of a V2X AS.

Figure 4:
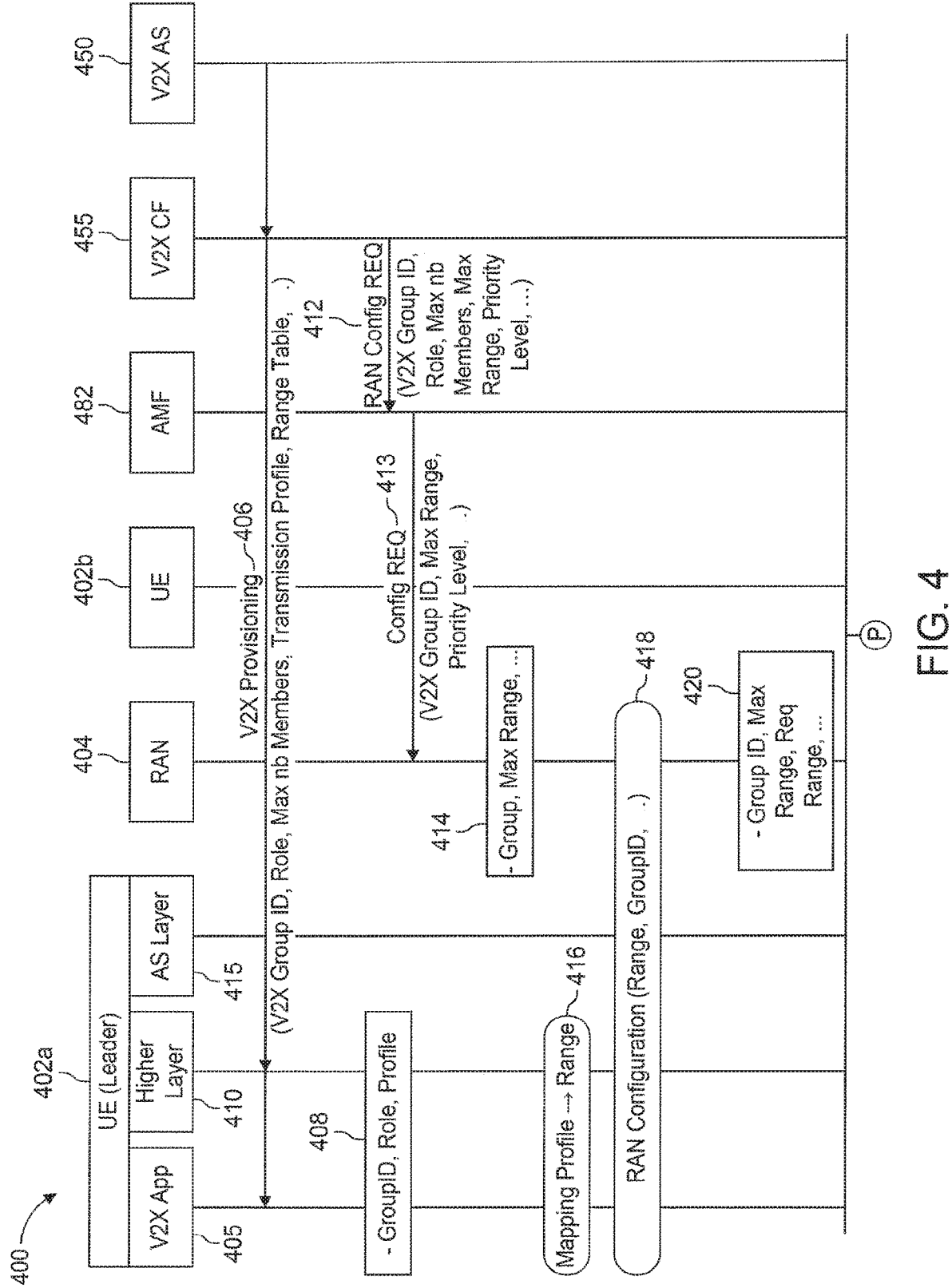
FIG. 4 is a signaling diagram illustrating an example high-level overview of vehicle to everything (V2X) platooning.
Figure 4:
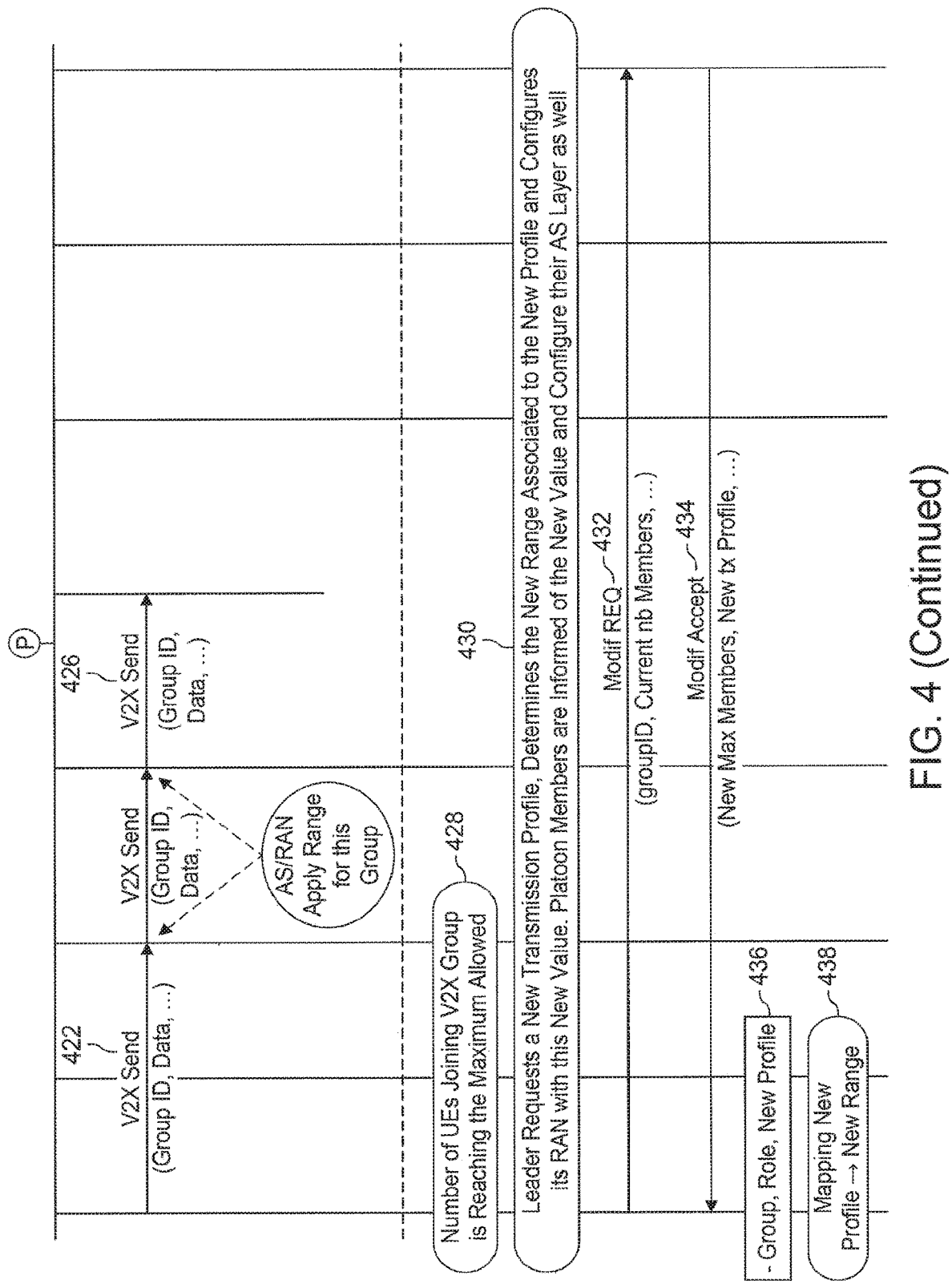

FIG. 4 illustrates an example high-level overview 400 of vehicle to everything (V2X) platooning, which may be used in combination of any of other embodiments described herein. Platooning related parameters may be configured onto the UE 402a. These platooning related parameters may be pre-configured or received at startup and may be updated at any time by a V2X CF (or PCF) and/or a V2X AS. For example, at step 406, the UE 402a may receive, from a V2X CF 455 (or PCF) or a V2X AS 450, a V2X provisioning message that includes such parameters related to the V2X platooning. These parameters may be received by the V2X application 405 and/or V2X layer (also referred to as higher layer 410) running on the V2X device (i.e. UE 402a). These parameters may be a list of V2X application identifiers that the device is authorized to run. For each application identifier, these parameters may include a list of V2X group identifiers for which the device is a member. For each group identifier, the parameters may include, but are not limited to, a role (e.g. platoon leader or follower) or the like. The parameters such as the maximum number of members allowed, transmission profile, priority, validity timer, validity location or the like may be configured on the selected leader only and/or for each group. The parameters such as a range mapping table and/or mapping of coverage to range may be configured on the selected leader only. In addition, configuration may have an associated validity time and/or validity location, allowing many configuration entries (active/passive) to be selected by the UE (or the higher layer 410). At step 408, the UE 402 may locally store and/or maintain these parameters including the transmission profile.

The transmission profile that includes QoS parameters (e.g., transmission rate, maximum end-to-end latency, etc.) may be extended with V2X specific parameters that are used to determine the range to be configured at the AS layer 415. For example, the following V2X specific parameters may be included per platoon: device (e.g., platoon members) maximum size (e.g., length, width, height), distance between devices (e.g., front/back, on the side), platoon arrangement (e.g., single line, double line (i.e. two devices side-by-side), etc.), type of required communication (e.g., each device must be able to reach all other devices, each device must be able to reach at least one other device, etc.), number of platoon members, or the like.

As described above, multiple V2X applications may run on a device and for each of these applications, many multicast groups (i.e. group identifiers) may exist, concurrently. The group identifiers may be unique per application, thus a combination of V2X application identifier and group identifier values may be used to uniquely identify each group. This combination may be referred to as a group ID. This combination may enable a peer UE 402b receiving data destined to a group ID to determine the associated multicast group and application.

Each group may have a different configuration and the communication layer (i.e. PC5 in this case) may adapt its behavior to such configuration on a per packet basis.

The higher layer 410 or V2X layer may handle the communication and configuration with the access stratum (AS) layer 415. For this purpose, at step 415, the higher layer 410 may map the transmission profile to AS layer parameters such as a range. For example, the higher layer 410 may determine the range to be configured on the AS layer 415 using: (1) the configured transmission profile to calculate the required coverage; and/or (2) the configured range mapping table specifying range values corresponding to the required coverage.

The required platoon coverage may be calculated by considering, for example, the number of members, their size, the platoon arrangement or the like. The obtained coverage value may be used with the range mapping table to determine the range that is needed. A range mapping table may have different forms. For example, it may contain a mapping of platoon coverage to a range (e.g., small, medium, large) to be configured at the AS layer 415. The range mapping table may be preconfigured at the UE 402a or received from the V2X CF 455 (or PCF) or the V2X AS 450.

The AS layer 415 may maintain a groupID-to-range table for V2X group ID/communication parameters (e.g., range) mapping. At step 418, the AS layer 415 may configure the RAN 404 with a list of configured group IDs and their associated range.

A V2X CF 455 (or PCF) may also configure the RAN 404 with V2X group specific parameters or information about whether a certain UE is allowed to be a platoon leader or request PC5 resources for a particular transmission range. Specifically, at step 412, the V2X CF 455 (or PCF) may send a RAN configuration request message to the AMF 482. At step 413, the AMF 482 may forward the configuration request message to the RAN 404. The RAN configuration request message or the configuration request message may include a V2X group ID, role, maxim number of members, maximum range, priority level, or the like. Once the RAN 404 receives the configuration request message, the RAN 404 may locally store or maintain the contents of the configuration message such as a group ID and maximum range. When the UE 402a initiates the RAN configuration at step 418, the RAN 404 may accept or reject the configuration requests from UEs based on these parameters. For example, the RAN 404 may accept the configuration request from the UE 402a if the range received from the UE 402a is less than the maximum range received from the V2X CF 455 (or PCF). Similarly, the RAN 404 may reject the configuration request from the UE 402a if the range received from the UE 402a is greater than the maximum range received from the V2X CF 455 (or PCF). The RAN 404 may reserve resource (e.g., channels) when the configuration request from a UE 402a is accepted. The RAN 404 and AS layer 415 may enforce communication parameters (e.g., range) to the platoon members. Once the RAN configuration between the AS layer 415 and the RAN 404 are completed, the AS layer 415 and RAN 404 may apply the range for the V2X group associated with the range. For example, the V2X application 405 may send data with a group ID to the AS layer 415 at step 422. The AS layer 415 may send the data with the group ID to the platoon member (i.e. UE 402b) within the range configured by the AS layer 415 and RAN 404 at step 426.

A platoon role configured on the UEs 402a, 402b may determine the UE's behavior. For example, the UE 402a selected as the platoon leader may share configuration information with platoon members (e.g., UE 402b) and dynamically adapt the communication parameters when required, for example, by querying the V2X AS 415 for new parameters under certain conditions. For example, a platoon leader may receive a new transmission profile and map the transmission profile to a range. The platoon leader may then forward the result to the platoon members. Specifically, if the number of members joining the platoon reaches the maximum number of platoon members allowed at step 428, the platoon leader (i.e. UE 402a) may request a new transmission profile from the V2X AS 450, recalculate the range using the new transmission profile and the range mapping table, and configure the AS layer with a new range value associated with the group ID at step 430. This new configuration may, for example, result in an increase (or decrease) of transmission power, modulation and coding scheme (MCS), number of retransmissions, or the like. In addition, the platoon leader (i.e. UE 402a) may configure the platoon members (e.g., UE 402b) with the new range value so that these platoon members (e.g., UE 402b) may also adapt their transmission by re-configuring their AS layer as described herein. In order to get the new transmission profile, the UE 402a may send a modification request message 432 to the V2X CF 455 (or PCF) or the V2X AS 450 at step 432 and receive a modification accept message 434 from the V2X CF 455 (or PCF) or the V2X AS 450 at step 434. Once the new transmission profile is received, the UE 402a may locally maintain the new transmission profile with a group ID and a role at step 436. The UE 402a may then determine a new range based on the new transmission profile and a range mapping table at step 438.

Roles in a platoon are described herein. As described above, a V2X AS may assign roles to V2X platoon members. The roles may be a leader or a follower. A platoon leader may be selected and control the group; other devices in the platoon may be followers. The platoon leader may interact with devices (i.e. followers) within the platoon and with a V2X CF (or PCF) and a V2X AS. The platoon leader may collect information from the platoon and forward this information to the V2X AS (e.g. statistics, alarms, requests, or the like). The platoon leader may share information with the platoon, potentially from the V2X AS or other platoon members. The platoon leader may receive a range mapping table and save it locally. The platoon leader may receive a transmission profile and save it locally. The platoon leader may fetch or request a new transmission profile when it is needed (e.g., when more than the number of allowed UEs are joining the group or after some validity period). The platoon member may calculate the required coverage for a specific platoon (e.g., using the transmission profile) and maps it to a specific range (e.g., using the range mapping table). The platoon leader may configure the AS layer with the range and groupID. The platoon leader may forward (e.g., multicasts over PC5) the range value to the platoon members. The platoon leader may function as a local decision maker (i.e. local decisions are forwarded to platoon members (followers)) and eventually to the V2X AS, for quick reaction (compared to going to the V2X CF and/or V2X AS) and to offload the network/V2X CF/V2X AS (local decisions/tasks). Examples of local decision may include, but not limited to: whether to increase the range because of the increased number of members, whether to increase the allowed number of members, whether to split a group which has become too big (i.e. too many members), and whether to select a platoon leader for the newly formed group (i.e. after the split).

The platoon follower may interact with a platoon leader (directly/indirectly) and other platoon members. The platoon follower may send information/statistics/alarms to a platoon leader. In addition, the platoon follower may receive communication related configuration from the platoon leader (e.g., range) and configure the AS layer accordingly.

Figure 5:
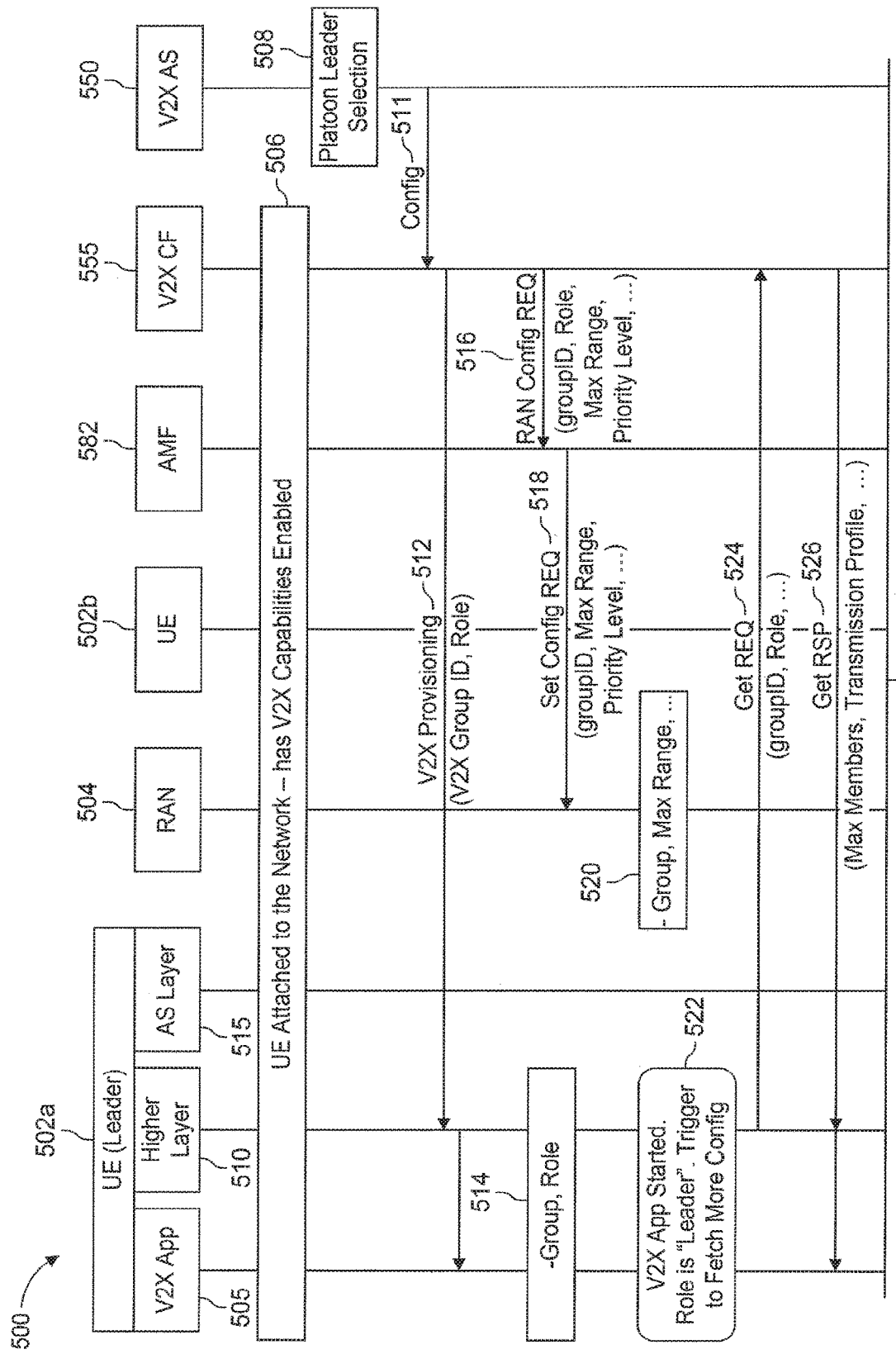
FIG. 5 is a signaling diagram illustrating an example platoon configuration and PC5 communication setup.
Figure 5:
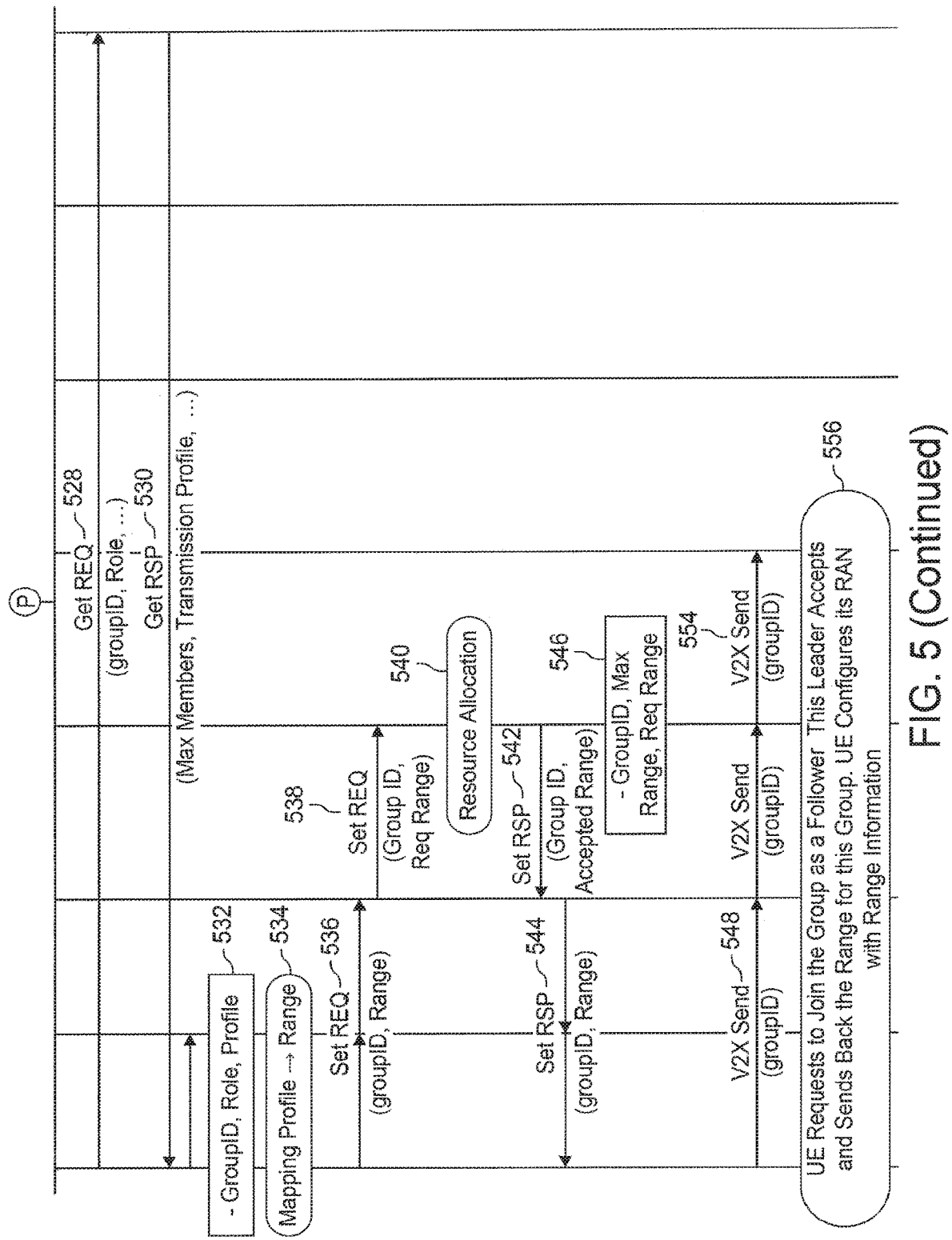

FIG. 5 illustrates an example platoon configuration and PC5 communication setup 500, which may be used in combination of any of other embodiments described herein. As illustrated in FIG. 5, at step 506, a V2X device (e.g., UE 502a or UE 502b) that has a V2X application 505, a higher layer 510 (or V2X layer) and an AS layer 515 may initially attach to the network that has V2X capabilities are enabled. After the UE 502a is attached to the network, the first steps for platoon creation may be the platoon leader selection and its provisioning. This may be handled by the V2X AS 550 (e.g., for the platoon leader selection at step 508) and the V2X CF (or PCF) (e.g., for the provisioning at step 512). Specifically, the V2X CF 555 (or PCF) may send a V2X provisioning message to the UE 502a at step 512 after the V2X CF 555 (or PCF) is triggered by a configuration message from the V2X AS at step 511. The V2X provisioning message may include, but is not limited to, the role (e.g., a leader, a member, or a follower), V2X application identifiers and V2X group identifiers. A more complete list may be provided as described above. The information about the role of a particular UE may also come from the V2X application 505 running on the UE 502a.

The V2X AS 515 may configure platoons based on various factors. Examples of such factors may include, but are not limited to, UE's location, UE's capabilities and capacities, number of devices in the platoon, amount of time the UE has been/not been a leader, or information stored in unified data management (UDM).

The V2X device (e.g., UE 502a or UE 502b) may be provisioned by the V2X CF 555 (or PCF) at startup, during registration or UE configuration update procedures. The V2X device may register to the network and may provide identification information, its capabilities (e.g., V2X support, or V2X applications), its capacities (e.g., maximum range, speed, device type, or the like), location information, or the like. The V2X device may be provisioned with V2X specific parameters. The V2X device may also be configured later from the V2X AS 550 via the V1 interface.

The V2X device (e.g., UE 502a or UE 502b) may receive the complete configuration or a minimal configuration in the V2X provisioning message at step 512. The V2X device (e.g., UE 502a) may locally store the configuration information such as a group ID and a role. If it is a minimal configuration, the V2X device may be configured with the role and the group ID. In the latter case, the V2X device (e.g., UE 502a) configured as a platoon leader may request a transmission profile, range mapping table, or the like when it is needed at step 522. For example, the UE 502a (i.e. the platoon leader) may send a message requesting a transmission profile when a V2X application 505 is started, initialized, or running. This is illustrated at steps 524 and 526, and steps 528 and 530 in FIG. 5, which are two alternatives for the UE 502a (i.e. the platoon leader) to fetch the transmission profile associated to the specified group. The steps 524 and 526 illustrates how the profile can be obtained from the V2X CF (or PCF). Specifically, the higher layer 510 (or V2X layer) may send a get request message that includes a group ID and a role to the V2X CF (or PCF) at step 524. The higher layer 510 (or V2X layer) may receive a get response message that includes a maximum number of allowed members and a transmission profile from the V2X CF 555 (or PCF) and forward the transmission profile to the V2X application 505 at step 526. Alternatively, the steps 528 and 530 illustrates how the profile may be obtained from the V2X AS 550. Specifically, the V2X application 505 may send a get request message that includes a group ID and a role to the V2X AS at step 528. The V2X application 505 may receive a get response message that includes a maximum number of allowed members and a transmission profile from the V2X AS 550 and forward the transmission profile to the higher layer 510 (or V2X layer) at step 530. The same transmission profile may be received using either of these alternatives (i.e. steps 524, 526 and steps 528, 530).

The transmission profile received from the V2X CF 555 (or PCF) or the V2X AS 550 may be per group ID (i.e. per V2X application) and may be only sent to the platoon leader, UE 502a, (i.e. not to the followers). At step 532, the platoon leader (i.e. UE 502a) may locally store and maintain the group ID, the role, and the transmission profile. At step 534, the platoon leader (i.e. UE 502a) may use this transmission profile to determine the range to be configured at the AS layer. The range may be determined based on a range mapping table that is associated with the transmission profile. Thus, the range may be different per a transmission profile. The range mapping table may be received or downloaded once from the network, but it may be received or downloaded multiple times from the network when it is needed. Alternative or additionally, the range mapping table may be pre-stored or predetermined in UEs 502a, 502b.

The range mapping table may be only sent to the platoon leader. The range mapping table may be provisioned at startup or may be queried later by the platoon leader (e.g., UE 502a) (as the transmission profile). The range mapping table may have different forms or formats. For example, it may comprise a mapping of platoon coverage to range (e.g., small, medium, large) to be configured at the AS layer 515. The platoon coverage may be obtained by calculating number of members, their size, arrangement, or the like. The obtained values may be used with the range mapping table. It may be configured only once. It is however possible for the V2X device (e.g., UE 502a, UE 502b) to fetch an updated range mapping table (e.g., to refresh it) in case the range mapping table has been downloaded a long time ago. The V2X CF 555 (or PCF) or V2X AS 550 may also decide to re-send the range mapping table with the transmission profile from time to time or when it's updated.

The platoon leader (e.g., UE 502a) may create the V2X platoon or group that comprises the platoon leader and platoon followers or members. For example, the platoon leader (e.g., UE 502a) may enable the multicast communication for a specific V2X group. As described above, PC5 communication is handled at the AS layer 515. Thus, the platoon leader (e.g., UE 502a) may need to configure the AS layer 515 prior to the platoon creation and enablement of communication between platoon members.

The platoon leader (e.g., UE 502a) may configure the AS layer 515 with received configuration impacting the AS layer 515, for example, range, priority and associated V2X group ID. The AS layer 515 may keep track of the received configuration and apply the specified range when transmitting data is related to the associated V2X group ID. In order to apply the range to the V2X platoon, the platoon leader (e.g., UE 502a) may need to configure the range with the RAN 504 and other platoon members (e.g., UE 502b). Specifically, once the range is determined at step 534, the V2X application 505 and/or the higher layer 510 (or V2X layer) may send a set request message to the AS layer 515 at step 536 to configure the AS layer 515 with the range. This set request message may include the range and a group ID associated with the range. The AS layer 515 may then send another set request message to the RAN 504 (e.g., a gNB) with the range and the group ID at step 538. If the range (i.e. requested range) received from the AS layer 515 is smaller than the maximum range configured or predetermined in the RAN 504, the RAN 504 may accept the range (i.e. requested range) and allocate resources (e.g., channels) for the UE 502a at step 540. The RAN 504 may send a set response message to the UE 502a indicating which resources (e.g., channels) the UE 502a or the V2X platoon may use at step 542. If the range (i.e. requested range) received from the AS layer 515 is greater than the maximum range configured or predetermined in the RAN 504, the RAN 504 may send a set response message to the UE 502a indicating that the requested range is not accepted at step 542. The set response message transmitted from the RAN 504 may also include a group ID, a range (e.g., accepted range, rejected range, or maximum range allowed in the RAN 604), and/or an indicator indicating the acceptance or rejection of the range. The RAN 504 (e.g., gNB) may locally store or maintain the group ID, the maximum range, the requested range, or the like at step 546. Once the AS layer 515 receives the set response message from the RAN 604, the AS layer 515 may send another set response message to the higher layer 510 (or V2X layer) and the V2X application 505 with the range (e.g., accepted range, rejected range, or maximum range allowed in the RAN 604) at step 544.

As described above, a V2X device (e.g., UE 502b) may be configured as a member of multiple V2X groups and each group may have different communication requirements (i.e. a different configuration). In this case, there can be a single same platoon leader (e.g., UE 502a) for each group or multiple different platoon leaders for each group. To support per group configuration, the AS layer 515 may maintain a groupID-to-range table for V2X group ID vs specific configuration (e.g., range). The configuration may be applied on a per-packet basis (e.g., using the groupID-to-range table). As well, a different leader for each group may be selected or a specific device may be selected as the leader for many platoons. In any case, each device may be configured with a role per platoon. For example, the device selected as a leader may be leader in multiple platoons or in one only.

The platoon leader (e.g., UE 502a) may then advertise its presence, specifying the group ID and listen for followers' join request. For example, as illustrated in FIG. 5, at step 548, the V2X application 505 of the platoon leader 505a may send a V2X send message to the AS layer 515 with the group ID. The AS layer 515 may send the V2X send message to the UE 502b with the group ID. Other devices (i.e. platoon members) may also be configured with their role and V2X group ID. These devices may wait for the platoon creation. For example, they may configure their AS layer with minimal parameters (e.g. pre-configured generic range and group ID) and they may listen on PC5 for multicast messages from the platoon leader (e.g., UE 502a). Once communication is established (i.e. followers have received a message for the group ID), these devices (i.e. followers) may contact the platoon leader (e.g., UE 502a) to join the group. The platoon leader (e.g., UE 502a) may configure the followers with communication parameters such as range specific to the group ID or the like. The followers may also configure their AS layer with the received parameters such as specific range and group ID. For example before the UE 502b become a member of the V2X platoon where the UE 502a is the platoon leader, the UE 502b may request the platoon leader (i.e. UE 502a) to join the V2X group as a follower at step 556. The platoon leader (i.e. US 502a) may accept or reject the request. If the request is accepted, the platoon leader (i.e. UE 502a) may send the range to the UE 502b for this V2X group. The UE 502b may configure its AS layer with the range.

In an embodiment, the multicast communication may be initiated by the platoon leader sending a message (e.g., advertisement message) using the platoon leaders L2 ID as the source L2 ID and the destination L2 ID is set to the group ID. This message may specify the required QoS parameters that the UE who want to join needs to support. There may be no QoS parameters negotiation. The advertisement message may be sent by the platoon leader using a configured (in the UE or by the V2X CF or PCF) broadcast layer 2 destination ID. Interested V2X UE may use this broadcast layer 2 ID to tune to the PC5 broadcast information. The PC5 broadcast information may provide information about the source/destination ID corresponding to particular V2X group/multicast communication. It should be noted that if the platoon leader decides to change the group ID of the multicast communication, it may need to update the information sent on the broadcast PC5 channel. The source/destination ID broadcasted using the broadcast PC5 group ID may also be used by the V2X UEs (e.g., follower UEs) to establish the unicast link with the platoon leader if needed.

All devices registered as followers (e.g., platoon members) may listen for this specific destination L2 ID. The received message may be passed up to the V2X layer, which is able to decode the message since it is configured with the security related parameters (e.g., keys) that makes PC5 communication secured.

The followers that want to contact the platoon leader (e.g., to join the group) may use their own L2 ID as the source L2 ID and the leaders L2 ID as the destination L2 ID. The leader's L2 ID may be learned from the multicast message. The group ID may be specified in a field of the join request. The leader may save the follower's L2 ID and may use it if needed for unicast communication. For example, if the platoon leader wants to configure a follower as the new leader, it may directly contact the follower using its L2 ID.

The required/advertised QoS parameters for a specific group ID may change, for example, if new QoS parameters are received as part of the transmission profile update procedure (i.e. Get REQ/Get RSP as illustrated in FIG. 5). In this case, a new advertisement message may be multicast, including the new required QoS parameters. All members may need to adapt to the new QoS parameters.

For privacy reasons (e.g., to avoid tracking an L2 ID), the unicast (or destination) L2 ID of the platoon leader and followers may need to be changed periodically for ongoing communication. For multicast communication, since the group ID is used as the destination, the potential tracking issue may also apply to this case. The multicast identifier (i.e. group ID) may also need to be changed periodically. Thus, a method for changing the multicast identifier (group ID) needs to be determined.

Embodiments for a platoon leader and follower L2 ID change are described herein.

The platoon leader may change its L2 ID periodically (e.g., based on time, location, request from upper layer or peer UE, or the like). The platoon leader may generate a new L2 ID and multicast it to its followers. A platoon leader may use a distinct L2 ID per multicast group. If the same L2 ID is used for many multicast groups, then the new L2 ID may be multicast to all these groups. The leader may multicast its L2 ID few times to make sure all followers received it or may request a response from the followers. A specific time to apply this new L2 ID (i.e. validity time) may be specified to ensure that all followers will use the new L2 ID at the same time.

Followers may change their L2 ID as well periodically (e.g., same triggers as leader). The follower may generate a new L2 ID and send it to the leader using the join message. The current L2 ID may be specified as well as the new L2 ID. The leader receiving this join message may know that the new L2 ID needs to be kept and used in following communication. A join acknowledgement may be sent back to the follower still using the old L2 ID as the destination L2 ID. Further communication may use the new L2 ID. Followers that are allowed to multicast to the group and receive unicast messages from other members may use the multicast method described for the leader (above) to let the members know their new L2 ID.

Embodiments for group ID change are described herein.

All followers (i.e. devices that have successfully joined the multicast group) may be configured by the platoon leader (or V2X CF) with a new group ID, possibly security parameters, and upper layer identifier that may be applied at a specific time as an example. All followers and platoon leader may then start using this new configuration at the same time and stop using the previous group ID for communication. To make sure that all devices received the new group ID, the leader may multicast it multiple times or may request a response from the followers.

The original information (e.g., group ID and security parameters) may be still maintained at the V2X CF and/or V2X AS and at the leader. Devices may be still provisioned with this information.

A multicast message using the original group ID (with related security parameters and possibly upper layer identifier) may continue to be sent periodically by the platoon leader in case devices listening to the group ID would like to join. Devices that want to join may use the provisioned information and once the join request is accepted, these devices may be reconfigured by the platoon leader with the new parameters, on a secured link. These new followers may then immediately start using the new group ID and security parameters, and receive the multicast messages.

Figure 6:
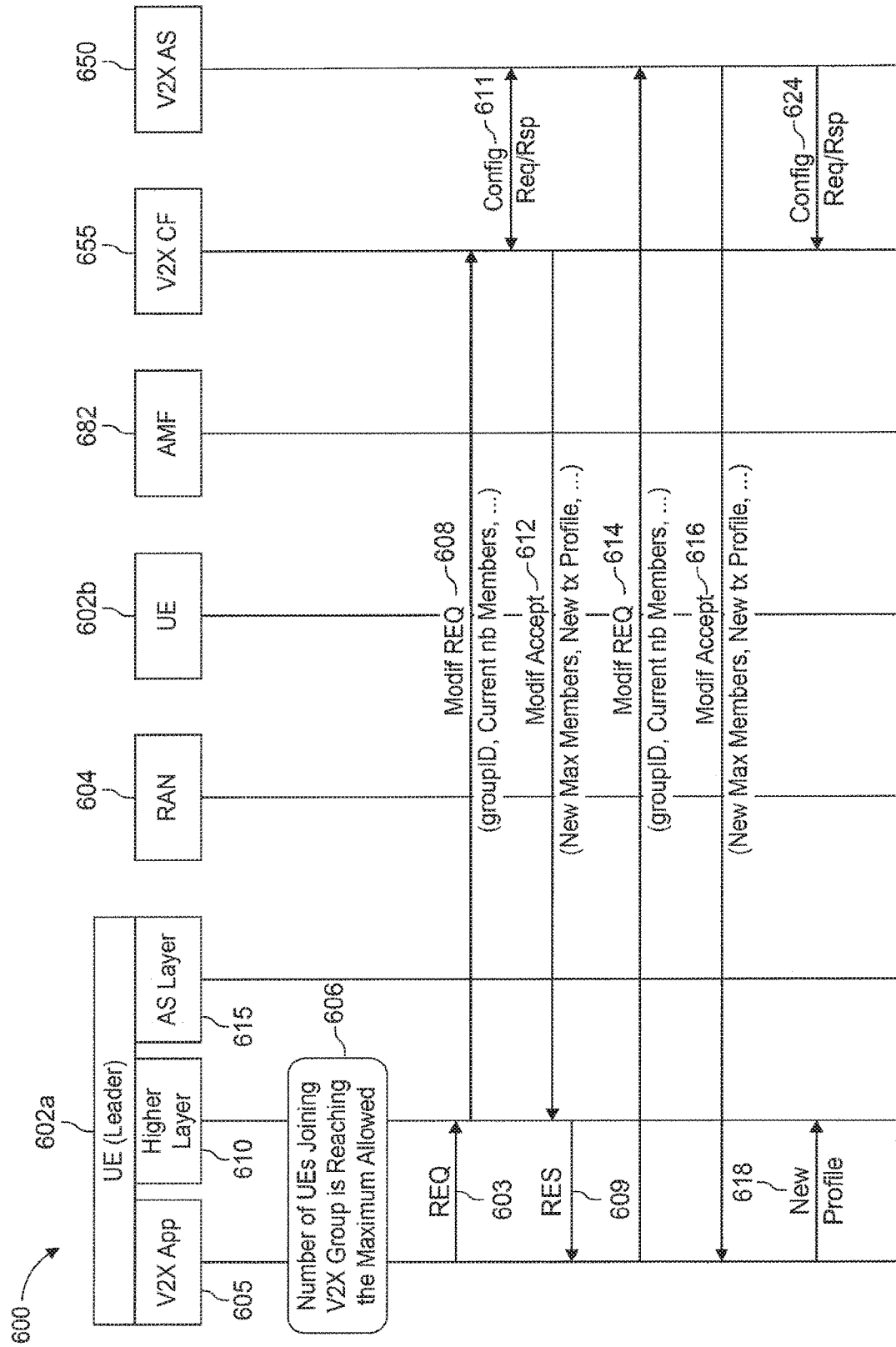
FIG. 6 is a signaling diagram illustrating an example of range adaptation based on a new transmission profile.
Figure 6:
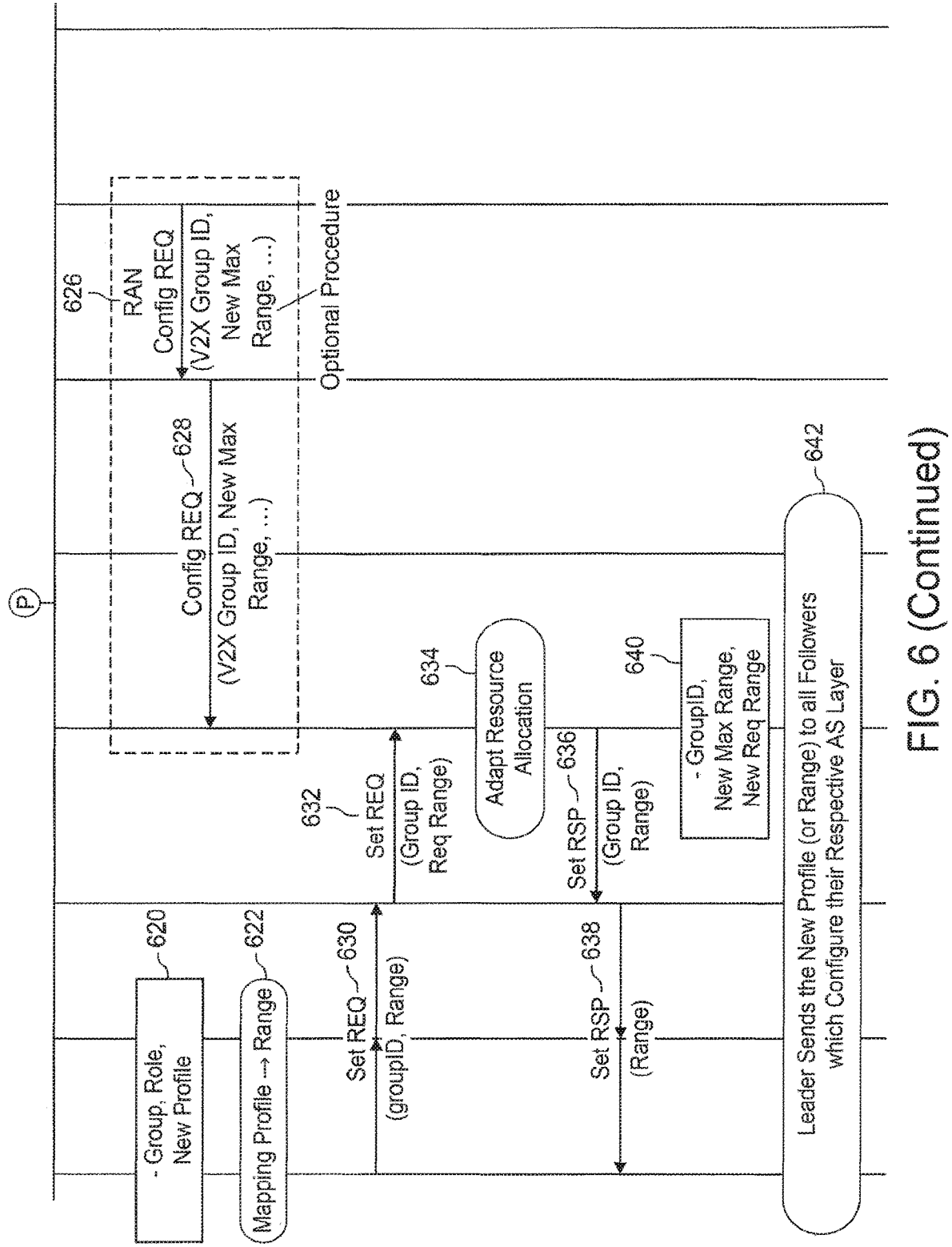

FIG. 6 illustrates an example 600 of range adaptation based on a new transmission profile, which may be used in combination of any of other embodiments described herein. In this example 600, it is assumed that a V2X platoon (or group) is already formed and V2X communication between the platoon members is already established as described above. As illustrated in FIG. 6, a platoon leader 602a may comprise a V2X application 605, a higher layer 610 (or V2X layer), and an access stratum (AS) layer 615. The platoon leader 602a may be configured with various parameters for V2X communication and platoon support as described above. Examples of those parameters may include, but are not limited to, a range mapping table, a group ID, a transmission profile and maximum number of allowed platoon or group members. As described above, the platoon leader 602a may determine the range to be configured at the AS layer 615 and share this range value with the platoon members such as UE 602b. UEs or devices that join the platoon or group later may also be configured with this range value.

For example, in case where the number of UEs joining the V2X platoon (or group) reaches the maximum number of allowed members in the platoon at step 606 (or a threshold is reached), the platoon leader 602a may request a new transmission profile to obtain additional coverage (i.e. range), which maps to a new range, allowing all platoon members to communicate with each other. In case where the number of UEs joining the V2X platoon (or group) does not reach the maximum number allowed (or a threshold is not reached), the platoon leader 602a may not request a new transmission profile.

Specifically, at step 608 or step 614, the platoon leader 602a may query the V2X CF 658 (or PCF) or V2X AS 650 to obtain a new transmission profile. For example, when the number of UEs joining the V2X platoon exceeds the maximum number, the V2X application 605 may send a request to the higher layer 610 (or V2X layer) indicating that the threshold is reached at step 603. The higher layer 610 (or V2X layer) may then generate a modification request message requesting the new transmission profile. The modification request message may include, but are not limited to, a group ID associated with the V2X application 605, a current number of platoon members, and a number of UEs joining the V2X platoon. At step 608, the higher layer 610 (or V2X layer) may transmit the modification request message to the V2X CF 655 (or PCF) through RAN 604 and AMF 682. The V2X CF 655 (or PCF) or V2X AS 650 may accept the modification request and provide a new transmission profile or it may reject the modification request. For example, if the modification request is accepted by the V2X CF 655 (or PCF) or V2X AS 650, at step 612, the V2X CF 655 (or PCF) may transmit a modification accept message to the higher layer 610. The modification accept message may include, but are not limited to, a new maximum number of platoon members, and a new transmission profile associated with the group ID. Although it is not illustrated in FIG. 6, if the modification request is not accepted (i.e. rejected) by the V2X CF 655 (or PCF) or V2X AS 650, a modification reject message may be returned to the higher layer 610 (or V2X layer) with a reason code. The higher layer 610 (or V2X layer) may then send the response message to the V2X application 605 at step 609 indicating whether the request at step 603 is accepted or not. The response message at step 609 may include, but is not limited to, an indicator indicating whether the request is accepted or not, the new maximum number of platoon members, the new transmission profile, and/or the reason code depending on the result. At step 611, the V2X CF 655 (or PCF) may exchange configuration request and response messages with the V2X AS 650 to obtain a new transmission profile and/or transmission range and then the V2X CF (or PCF) may configure the network (i.e. RAN 604) with the new transmission profile and/or transmission range.

Alternatively or additionally, when the number of UEs joining the V2X platoon exceeds the maximum number of allowed UEs, the V2X application 605 may generate and send a modification request message at step 614 to request the new transmission profile. The modification request message may include, but are not limited to, a group ID associated with the V2X application 605, current number of platoon members, and number of UEs joining the V2X platoon. The modification request message may be transmitted to the V2X AS 650 through V1 interface as shown in FIG. 3. The V2X AS 650 may accept the modification request and provide a new transmission profile or it may reject the modification request. For example, if the modification request is accepted by the V2X AS 650, at step 616, the V2X AS 650 may transmit a modification accept message to the V2X application 605. The modification accept message may include, but are not limited to, a new maximum number of platoon members, and a new transmission profile associated with the group ID. At step 624, once the modification request is accepted, the V2X AS 650 may also exchange configuration request and response messages with the V2X CF 655 (or PCF) to configure the network (i.e. RAN 604) with the new transmission profile and/or transmission range. Although it is not illustrated in FIG. 6, if the modification request is not accepted (i.e. rejected) by the V2X AS 650, a modification reject message may be returned to the V2X application 605 with a reason code. Once the V2X application 605 receives the modification accept message at step 616, the V2X application may send the new transmission profile to the higher layer 610 (or V2X layer) at step 618 to configure the AS layer 615 with the new transmission profile.

The V2X CF 655 (or PCF) or V2X AS 650 may optionally configure the RAN 604 with a new maximum range associated with the new transmission file. For example, at step 626, the V2X CF 655 (or PCF) may transmit a RAN configuration request message to the AMF 682. The RAN configuration request message may include a V2X group ID, a new maximum range associated with the new transmission profile, and the like. Upon receiving the RAN configuration request message, at step 628, the AMF 682 may send a configuration request message to the RAN 604 (or a base station). The configuration request message may also include a V2X group ID, a new maximum range associated with the new transmission profile. Upon receiving the configuration request message, the RAN 604 may configure the maximum range of the V2X platoon group that requested the new transmission profile.

Once the modification accept message is received at step 612 or step 616, the UE 602a may locally maintain the new maximum number, the new transmission profile, a group ID associated with the new transmission profile, and its role in the V2X platoon. At step 622, the UE 602a, the platoon leader, may then determine the range associated with the new transmission profile and configure its AS layer 615 with the new range value. For example, the UE 602a may calculate a coverage value based on the new transmission profile. The UE 602a may then compare the coverage value with a range mapping table, and determine, based on the new range mapping table, the range associated with the new transmission profile. Specifically, the V2X application 605 or the higher layer 610 (or V2X layer) may calculate the coverage that is needed, by considering the current number of members, their size, the platoon arrangement, the distance between the devices, or the like. These parameters may be specified in the transmission profile as described above. Once the required coverage is calculated, the higher layer 610 may use the range mapping table to figure out which range value should be configured at the AS layer 615. For example, a platoon may comprise devices of large size (e.g., trucks with long van), maximum 6 members, arrangement of platoon 1×1, or the like. These parameters may map to a range value of medium (e.g., range value=medium). If a new transmission profile increases the maximum number of members to 10 as an example, then the new range value obtained may be large (e.g., range value=large). In another example, a platoon may comprise devices of small size (drone), maximum 20 members, arrangement of platoon 4×5, or the like. This may map to a range value of small (e.g., range value=small). The platoon leader 602a may save the new range locally with the associated group ID. It is noted that the range mapping table may be predetermined in the UE 602a or received from the V2X CF 655 (or PCF) or the V2X AS 650 during the V2X provisioning procedure ad described above.

Once the range is determined, the V2X application 605 or the higher layer 610 (or V2X layer) may send a set request message to the AS layer 615 at step 630 to configure the AS layer 615. This set request message may include the range and a group ID associated with the range. The AS layer 615 may then send another set request message to the RAN 604 (e.g., a gNB) with the range and the group ID at step 632. If the range (i.e. requested range) received from the AS layer 615 is smaller than the maximum range configured or predetermined in the RAN 604, the RAN 604 may accept the range (i.e. requested range) and allocate resources (e.g., channels) for the UE 602a or the V2X group associated with the UE 602a at step 634. The RAN 604 may send a set response message to the UE 602a indicating which resources (e.g., channels) the UE 602a or the V2X platoon may use at step 636. If the range (i.e. requested range) received from the AS layer 615 is greater than the maximum range configured or predetermined in the RAN 604, the RAN 604 may send a set response message to the UE 602a indicating that the requested range is not accepted at step 636. The set response message transmitted from the RAN 604 may also include a group ID and a range (e.g., accepted range, rejected range, or maximum range allowed in the RAN 604). The RAN 604 (e.g., gNB) may locally store or maintain the group ID, the maximum range, the requested range, or the like at step 640. Once the AS layer 615 receives the set response message from the RAN 604, the AS layer 615 may send another set response message to the higher layer 610 (or V2X layer) and the V2X application 605 with the range (e.g., accepted range, rejected range, or maximum range allowed in the RAN 604) at step 638.

At step 642, the new range (i.e. accepted range) may be sent to all followers or members of the V2X platoon to re-configure their respective AS layer to apply the new range value. The new transmission profile may needs to be applied to the existing V2X platoon. For example, the new transmission profile may replace the existing transmission profile to be applied to the existing V2X platoon. Specifically, a V2X platoon identifier (i.e. group ID) may initially be associated with the first received transmission profile. After the new transmission profile is received, the same V2X platoon identifier (i.e. groupID) may be associated with the new transmission profile.

The V2X AS 650 may also configure the V2X CF 655 (or PCF) with the new range. This is to allow the V2X CF 655 (or PCF) to forward that new configuration to the concerned RAN. It should be noted that configuring the RAN 604 at this point may be optional The configuration of the RAN 604 may not be required if the new range allocated for this platoon is smaller than the maximum range that was previously configured at the RAN 604.

Figure 7:
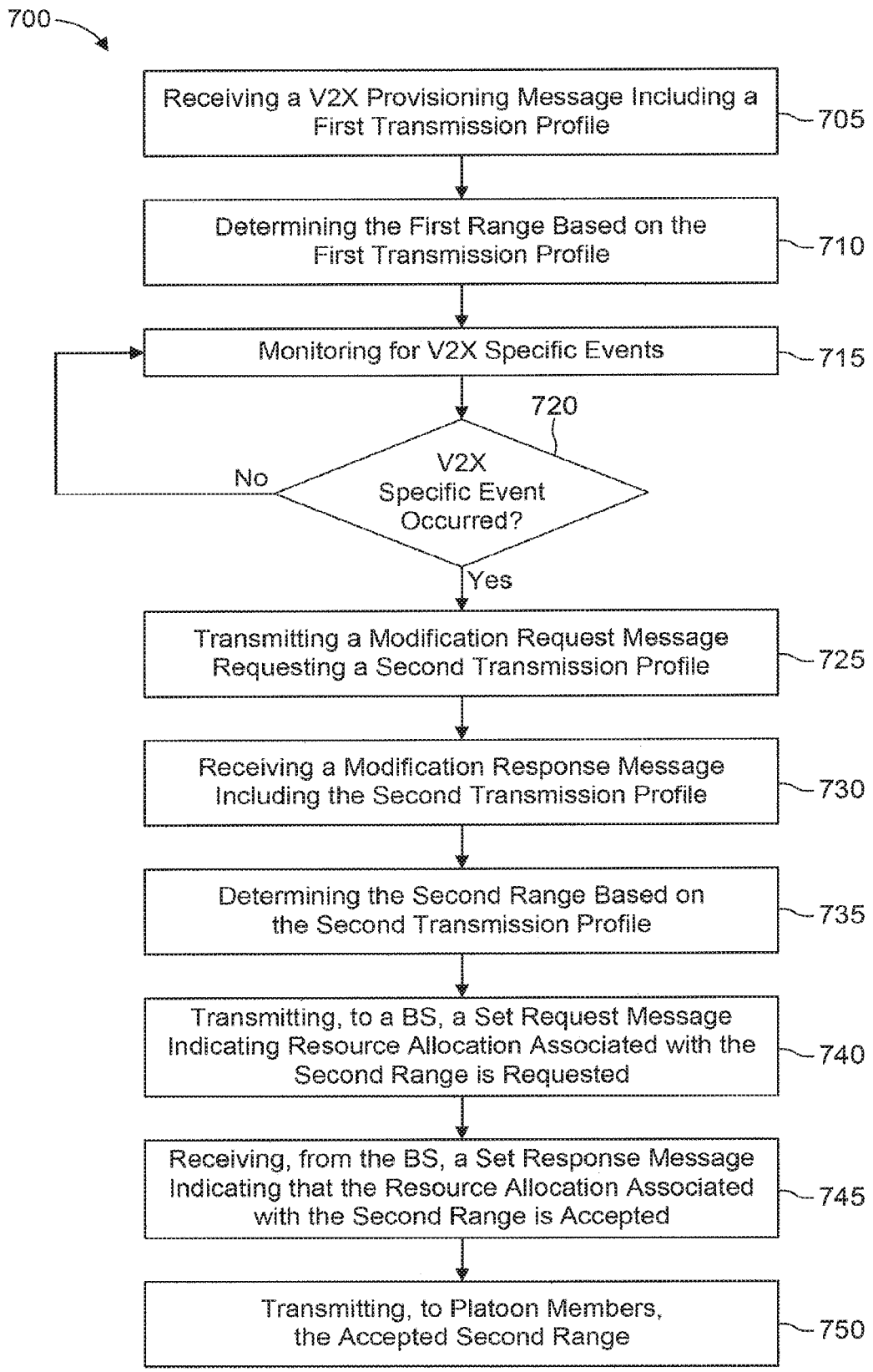
FIG. 7 is a diagram illustrating an example procedure for range adaption based on a new transmission profile.

FIG. 7 illustrates an example procedure 700 for range adaption based on a new transmission profile, which may be used in combination of any of other embodiments described herein. For example, at step 705, a UE may receive, from a V2X CF (or PCF) or a V2X AS, a V2X provisioning message that includes configuration information for the V2X platoon such as a transmission profile. The transmission profile may include quality of service (QoS) parameters, V2X specific parameters, or the like. The QoS parameters may include a transmission rate, maximum end-to-end latency, or the like. The V2X specific parameters may include, but are not limited to, a maximum size of a UE, a distance between UEs in the V2X platoon, an arrangement of the V2X platoon, a type of required communication between UEs in the V2X platoon, a number of UEs in the V2X platoon and a maximum number of UEs in the V2X platoon. The V2X provisioning message may also include a V2X group ID, a maximum number of UEs in a V2X platoon, a range mapping table, or the like.

Upon receiving the V2X provisioning message, at step 710, the UE may determine, based on the transmission profile, a first range that is used to configure the PC5 communication (e.g., AS layers) of other UEs (i.e. followers or members) associated with the V2X platoon. Specifically, the UE may calculate a coverage value using the QoS parameters and/or the V2X specific parameters in the transmission profile. Once the UE obtained the coverage value, the UE may compare the coverage value with data in the range mapping table and determine, based on the range mapping table, the first range. The range determined based on the range mapping table may indicate small range, medium range, or large range. Examples of parameters from the transmission profile and used to calculate the range may include, but are not limited to, the distance that a signal can reach within a platoon, the distance between devices within a platoon (e.g., from the first vehicle to the last vehicle), a number of device in a platoon, a transmission power. The term range and transmission range may be interchangeably used throughout this disclosure.

Upon determining the first range, the UE may transmit, to a base station (BS) associated with the RAN, a request message that includes the first range and an indicator indicating that resource allocation associated with the first range is requested to the RAN. If RAN accepts the request (i.e. the first range), the RAN may allocate resources (e.g., channels) for the V2X platoon. The RAN (e.g., BS) may then send a response message to the UE. The response message may include the first range, the resource allocation associate with the first range, and an indicator indicating that the resource allocation associated with the first range is accepted by the RAN. The UE may then transmit, to the members of the V2X platoon, the first range and each member in the platoon may configure its respective PC5 communication with the received range. Specifically, each member may configure its respective AS layer to adapt the coverage of the V2X platoon associated with the first range.

Once the PC5 communication of the V2X platoon is configured with the first range, at step 715, the UE may monitor for one or more V2X specific events that may trigger the reconfiguration of the first range. If one or more V2X specific events are occurred, the UE may transmit a modification request message to the V2X CF (or PCF) or the V2X AS at step 725. If one or more V2X specific events have not occurred, the UE may keep monitoring the V2X specific events at step 715. For example, when a number of UEs joining the V2X platoon exceeds a maximum number of allowed UEs in the V2X platoon (i.e. V2X specific event occurred), the UE may transmit, to the V2X CF (or PCF) or the V2X AS, a modification request message requesting a second transmission profile at step 725. The UE may then receive, from the V2X CF (or PCF) or the V2X AS, a modification response message that includes the second transmission profile at step 730. Similar to the first transmission profile, the second transmission profile may include one or more quality of service (QoS) parameters and one or more V2X specific parameters. The one or more V2X specific parameters in the second transmission profile may comprise a maximum size of a UE, a distance between UEs in the V2X platoon, an arrangement of the V2X platoon, a type of required communication between UEs in the V2X platoon, a number of UEs in the V2X platoon and a maximum number of UEs in the V2X platoon.

Upon receiving the modification response message, at step 735, the UE may determine, based on the second transmission profile, a second range that is used to reconfigure the PC5 communication of other UEs (e.g., followers or members) associated with the V2X platoon. Specifically, the UE may calculate the coverage value using the QoS parameters and/or the V2X specific parameters in the second transmission profile. Once the UE obtained the new coverage value, the UE may compare the coverage value with data in the range mapping table. The UE may then determine, based on the range mapping table, a new range (or second range). The new range determined based on the range mapping table may indicate small range, medium range, or large range Examples of the V2X parameters specified in the transmission profile may include, but are not limited to, the distance that a signal can reach within a platoon, the distance between devices within a platoon (e.g., from the first vehicle to the last vehicle), a number of device in a platoon, a transmission power.

Once the new range is determined, the UE may transmit, to the base station (BS) associated with the RAN, a request message that includes the new range and an indicator indicating that resource allocation associated with the new range is requested to the RAN at step 740. The RAN may compare the new range to a maximum range that is predetermined or configured by the V2X CF (or PCF). If the RAN accepts the request (i.e. the new range is less than the maximum range), the RAN may allocate resources (e.g., channels) for the V2X platoon. The RAN (e.g., BS) may then send a response message to the UE and the UE may receive the response message at step 745. The response message may include the new range, the resource allocation associated with the new range, and an indicator indicating that the resource allocation associated with the new range is accepted by the RAN. The UE may then transmit, to the members of the V2X platoon, the new range at step 750. Each member in the platoon may configure its respective PC5 communication. Specifically, each member may configure its respective AS layer to adapt the PC5 communication of the V2X platoon associated with the second range.

The RAN may need to be configured with a range for resource allocation. This configuration may be received from the V2X CF (or PCF) via the AMF. As described above, the range may be applicable per platoon. Thus, the associated group ID may be specified as well. The RAN may maintain and enforce this range. The V2X CF (or PCF) may also configure other parameters such as priority level. The RAN configuration from the V2X CF (or PCF) and UE side is illustrated in FIG. 5 and FIG. 6.

The RAN may be configured (e.g., as part of the UE profile at the RAN) with the maximum allowed range and may adapt its transmission with the value specified by the platoon leader. For example, the platoon leader may be configured with a range value smaller than the allowed maximum range value configured at the RAN. The platoon leader may configure its AS layer with its range value, which may then configure the RAN with this same value. This value may then be used for PC5 communication. The platoon leader may eventually request a range increase (or decrease) which goes up to the RAN. Examples of such triggers may be members joining/leaving the group. The RAN may accept/reject the request depending of its maximum allowed range configuration (previously received from the V2X CF or PCF) and potentially other factors such as load. The RAN may return the applied range to the AS layer, which forwards the information to the higher layer (i.e. V2X layer) and up to V2X application.

Platoon splitting and merging are described herein. A V2X AS may decide to split a platoon for various reasons. For example, a platoon may be split when the platoon is becoming too big (i.e. too many members), thereby requiring a very large range. The platoon may be split when some devices may go to different final destinations although a portion of the route is the same (i.e. the whole group may move together for some time and then the group is split when specific location is reached). The platoon may be split for temporary split and merge, (i.e. sub-groups are expected to eventually leave the main group and potentially merging back). The platoon may be split due to hierarchical leadership roles: one group leader and many sub-groups leaders. For example, a group of trucks of different formats is subdivided into two groups. Each group may be configured to stop at a gas station. However, the configuration is different for each group. Specifically, trucks with bigger gas tanks stop later while the trucks with smaller gas tanks stop sooner and more often. Trucks may merge back again somewhere on the route after fueling is done.

Splitting may be done by sending a new configuration to platoon members. A device may need to be selected as the platoon leader for the new platoon. Devices selected to be in this new platoon may be configured with the new group ID. A validity time may be associated with this new configuration to make sure that all members apply the new configuration at the same time.

The former platoon, which is now smaller, may be reconfigured to, for example, adjust the maximum number of members. The platoon leader may recalculate the required coverage/range once multiple devices have left the group and then reconfigure the AS layer and group members.

Local decision handled by a platoon leader is described herein. The platoon leader may be configured with a certain level of autonomy. For example, it may be configured to wait for configuration from the V2X CF (or PCF) or V2X AS and then apply and/or forward it to platoon members. Alternatively or additionally, the platoon leader may be configured with local decision authority. This means that the platoon leader may be allowed to take local decisions to be applied immediately to the platoon. The V2X AS may be informed of the decisions and triggering events and may eventually revert or confirm the local decisions.

Authority for local decisions may be allowed to quickly react to certain conditions.

The platoon leader may also be configured to decide or allocate the lead role to another device based on time as a leader, capabilities, load, or the like as the platoon size changes.

For example, when a group is becoming too large, the platoon leader that is allowed to take local decisions may decide to increase the range while waiting for the V2X AS decision. The platoon leader may configure its AS layer with the new range value and advertise this new value to the platoon members for their own AS layer configuration. The V2X AS is also informed of this new configuration.

In order to achieve this functionality, the platoon leader may be configured with multiple transmission profiles, for example, one profile to be used now and the other profile for increased or decreased number of members. The platoon leader may keep track of the number of members and apply a local decision, for example, when the maximum number of members is reached.

Later, the V2X AS may decide to maintain the leader's decision, further increasing the range or split the platoon as examples. Specifically, the V2X AS may decide to split a platoon as described above. This may be done by sending a new configuration to the platoon members. A device needs to be selected as the leader for a new platoon. The device selected to be a leader in the new platoon may be configured with the new group ID. A validity time may be associated with this new configuration to make sure that all members will apply the new configuration at the same time.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU), the method comprising:
   receiving a plurality of vehicle to everything (V2X) transmission profiles, each V2X transmission profile of the plurality of V2X transmission profiles being associated with respective quality of service (QoS) parameters, wherein the respective QoS parameters are associated with a respective range; and
   transmitting data associated with one V2X transmission profile of the plurality of V2X transmission profiles over a PC5 interface, wherein
   the data is transmitted using respective QoS parameters associated with the one V2X transmission profile and using the respective range associated with the QoS parameters associated with the one V2X transmission profile, wherein each respective range associated with each of the QoS parameters associated with each respective V2X transmission profile is associated with groupcast communication over the PC5 interface.

2. The method of claim 1, wherein the respective QoS parameters associated with the one V2X transmission profile of the plurality of V2X transmission profiles comprise at least one of transmission power, modulation and coding scheme (MCS), or a number of retransmissions.

3. The method of claim 1, wherein each V2X transmission profile of the plurality of V2X transmission profiles is associated with a 5G QoS Identifier (5QI).

4. The method of claim 1, wherein each respective range associated with each of the QoS parameters associated with each respective V2X transmission profile is determined based on a range mapping table and the associated respective V2X transmission profile.

5. The method of claim 1, wherein each V2X transmission profile of the plurality of V2X transmission profiles is associated with a communication type.

6. The method of claim 1, wherein the WTRU is a platoon leader.

7. The method of claim 1, wherein each V2X transmission profile of the plurality of V2X transmission profiles is associated with a number of WTRUs associated with a V2X platoon.

8. The method of claim 1, further comprising:
receiving a message comprising an indication that the WTRU is assigned a role of leader of a V2X platoon, the V2X platoon comprising a plurality of WTRUs; and
transmitting the data to other WTRUs associated with the V2X platoon.

9. A wireless transmit/receive unit (WTRU) comprising a transceiver and a processor, the processor configured to:
receive, via the transceiver, a plurality of vehicle to everything (V2X) transmission profiles, each V2X transmission profile of the plurality of V2X transmission profiles being associated with respective quality of service (QoS) parameters, wherein the respective QoS parameters are associated with a respective range; and
transmit, via the transceiver, data associated with one V2X transmission profile of the plurality of V2X transmission profiles over a PC5 interface, wherein the data is transmitted using respective QoS parameters associated with the one V2X transmission profile and using the respective range associated with the QoS parameters associated with the one V2X transmission profile, wherein each respective range associated with each of the QoS parameters associated with each respective V2X transmission profile is associated with groupcast communication over the PC5 interface.

10. The WTRU of claim 9, wherein the respective QoS parameters associated with the one V2X transmission profile of the plurality of V2X transmission profiles comprise at least one of transmission power, modulation and coding scheme (MCS), or a number of retransmissions.

11. The WTRU of claim 9, wherein each V2X transmission profile of the plurality of V2X transmission profiles is associated with a 5G QoS Identifier (5QI).

12. The WTRU of claim 9, wherein each respective range associated with each of the QoS parameters associated with each respective V2X transmission profile is determined based on a range mapping table and the associated respective V2X transmission profile.

13. The WTRU of claim 9, wherein each V2X transmission profile of the plurality of V2X transmission profiles is associated with a communication type.

14. The WTRU of claim 9, wherein the WTRU is a platoon leader.

15. The WTRU of claim 9, wherein each V2X transmission profile of the plurality of V2X transmission profiles is based on a number of WTRUs associated with a V2X platoon.

16. The WTRU of claim 9, wherein the respective range of each V2X transmission profile of the plurality of V2X transmission profiles is associated with the respective QoS parameters associated with the respective V2X transmission profile.

17. The WTRU of claim 9, wherein the processor is further configured to:
receive, via the transceiver, a message comprising an indication that the WTRU is assigned a role of leader of a V2X platoon, the V2X platoon comprising a plurality of WTRUs; and
transmit the data to other WTRUs associated with the V2X platoon.

* * * * *